(12) United States Patent
Miyata

(10) Patent No.: US 8,948,035 B2
(45) Date of Patent: Feb. 3, 2015

(54) WIRELESS COMMUNICATION SYSTEMS EMPLOYING COMMUNICATION SCHEMES

(75) Inventor: Takeo Miyata, Daito (JP)

(73) Assignee: Kyocera Corporation, Kyoto-shi (JP)

( * ) Notice: Subject to any disclaimer, the term of this patent is extended or adjusted under 35 U.S.C. 154(b) by 80 days.

(21) Appl. No.: 13/392,257

(22) PCT Filed: Aug. 16, 2010

(86) PCT No.: PCT/JP2010/063801
§ 371 (c)(1),
(2), (4) Date: Feb. 24, 2012

(87) PCT Pub. No.: WO2011/024661
PCT Pub. Date: Mar. 3, 2011

(65) Prior Publication Data
US 2012/0155314 A1    Jun. 21, 2012

(30) Foreign Application Priority Data
Aug. 27, 2009 (JP) .................................. 2009-196617

(51) Int. Cl.
*H04J 1/16* (2006.01)
*H04W 72/04* (2009.01)

(52) U.S. Cl.
CPC .................................. *H04W 72/048* (2013.01)
USPC .......................................................... 370/252

(58) Field of Classification Search
USPC ......... 370/210, 219, 252, 323, 329; 455/63.4, 455/425, 436
See application file for complete search history.

(56) References Cited

U.S. PATENT DOCUMENTS

| 7,602,714 | B2 * | 10/2009 | Chen et al. ..................... 370/232 |
| 8,369,857 | B2 * | 2/2013 | Dimou et al. ................. 455/441 |
| 2002/0052210 | A1 * | 5/2002 | Takahashi ...................... 455/456 |
| 2003/0064729 | A1 * | 4/2003 | Yamashita ..................... 455/451 |
| 2004/0176136 | A1 | 9/2004 | Doi et al. |
| 2005/0128976 | A1 * | 6/2005 | Uehara et al. ................. 370/329 |
| 2006/0135150 | A1 * | 6/2006 | Oh ................................. 455/425 |

(Continued)

FOREIGN PATENT DOCUMENTS

| JP | A-2003-32167 | 1/2003 |
| JP | A-2006-345363 | 12/2006 |

(Continued)

OTHER PUBLICATIONS

Mar. 13, 2012 International Preliminary Report on Patentability issued in International Patent Application No. PCT/JP2010/063801.

(Continued)

*Primary Examiner* — Gregory Sefcheck
*Assistant Examiner* — Jael Ulysse
(74) *Attorney, Agent, or Firm* — Oliff PLC

(57) ABSTRACT

A terminal speed identification unit identifies the moving speed of a wireless terminal currently in communication. A ranging control unit sets the transmission cycle of a ranging signal of a wireless terminal moving at a speed greater than or equal to a predetermined speed shorter than the transmission cycle of a ranging signal of a wireless terminal moving at a speed below the predetermined speed. A transmission unit transmits a signal notifying the transmission cycle of a ranging signal to the wireless terminal. A reception unit receives a ranging signal from a wireless terminal currently in communication.

2 Claims, 20 Drawing Sheets

(56) References Cited

U.S. PATENT DOCUMENTS

| | | | |
|---|---|---|---|
| 2007/0121538 A1* | 5/2007 | Ode et al. | 370/323 |
| 2007/0147289 A1 | 6/2007 | Nibe | |
| 2007/0147485 A1* | 6/2007 | Sakamoto et al. | 375/219 |
| 2007/0293233 A1 | 12/2007 | Inoue et al. | |
| 2008/0171516 A1* | 7/2008 | Kakura | 455/63.4 |
| 2008/0316913 A1* | 12/2008 | Kim et al. | 370/210 |
| 2009/0104911 A1* | 4/2009 | Watanabe et al. | 455/436 |
| 2009/0170437 A1* | 7/2009 | Bhattad et al. | 455/63.1 |
| 2009/0207791 A1* | 8/2009 | Nakatsugawa | 370/329 |
| 2010/0027457 A1* | 2/2010 | Okuda | 370/315 |
| 2010/0220663 A1 | 9/2010 | Sawahashi et al. | |
| 2010/0309793 A1* | 12/2010 | Choi et al. | 370/252 |

FOREIGN PATENT DOCUMENTS

| | | |
|---|---|---|
| JP | A-2007-150971 | 6/2007 |
| JP | A-2007-180926 | 7/2007 |
| JP | A-2007-336421 | 12/2007 |
| JP | A 2008-289050 | 11/2008 |
| JP | A-2009-21661 | 1/2009 |
| JP | A 2009-21935 | 1/2009 |
| JP | A-2009-111951 | 5/2009 |
| JP | A-2009-130895 | 6/2009 |

OTHER PUBLICATIONS

Oct. 19, 2010 International Search Report issued in International Patent Application No. PCT/JP2010/063801 (with translation).

May 28, 2013 Notice of Grounds of Rejection issued in Japanese Patent Application No. 2009-196617 (with English-language translation).

* cited by examiner

FIG.5

| To | 30 |
|---|---|
| Tf | 5 |

FIG.6

| No | 20 |
|---|---|
| Nf | 4 |

FIG.7

| COMMUNICATION LEVEL | MCS | DATA RATE (bit/sym) |
|---|---|---|
| 1 | QPSK 1/2 | 1 |
| 2 | QPSK 3/4 | 1.5 |
| 3 | 16QAM 1/2 | 2 |
| 4 | 16QAM 3/4 | 3 |
| 5 | 64QAM 1/2 | 3 |
| 6 | 64QAM 2/3 | 4 |
| 7 | 64QAM 3/4 | 4.5 |

FIG.8

| LEVEL | MCS | UP_TH | DN_TH |
|---|---|---|---|
| 1 | QPSK 1/2 | a1 | |
| 2 | QPSK 3/4 | a2 | b1 |
| 3 | 16QAM 1/2 | a3 | b2 |
| 4 | 16QAM 3/4 | a4 | b3 |
| 5 | 64QAM 1/2 | a5 | b4 |
| 6 | 64QAM 2/3 | a6 | b5 |
| 7 | 64QAM 3/4 | | b6 |

WIRELESS COMMUNICATION SYSTEMS EMPLOYING COMMUNICATION SCHEMES

TECHNICAL FIELD

The present invention relates to a wireless base station, a wireless terminal, a wireless relay station, and a wireless base station system, particularly a wireless base station, a wireless terminal, a wireless relay station, and a wireless base station system for communication employing an OFDM (Orthogonal Frequency-Division Multiplexing) or OFDMA (Orthogonal Frequency-Division Multiple Access) scheme.

BACKGROUND ART

In various wireless communication systems such as WiMAX (Worldwide Interoperability for Microwave Access), next generation PHS (Personal Handy-Phone System), LTE (Long Term Evolution), and the like, OFDMA communication is carried out (for example, refer to Patent Literature 1 (Japanese Patent Laying-Open No. 2009-21661).

The usage of the OFDMA communication scheme is in progress by virtue of many advantages such as the high frequency usage efficiency, high resistance against fading, favorable compatibility with the MIMO (Multiple Input Multiple Output) technique corresponding to communication utilizing a plurality of antennas at both the transmission side and receiving side.

CITATION LIST

Patent Literature

PTL 1: Japanese Patent Laying-Open No. 2009-21661

SUMMARY OF INVENTION

Technical Problem

In OFDMA communication, the problems set forth below arise in the case where a wireless terminal moves at high speed.

The first relates to the ranging cycle.

In the case where a ranging cycle identical to that of a normal mode is employed when a wireless terminal is moving at high speed, the adjustment by ranging is poor since the distance between the wireless terminal and a wireless base station varies greatly within the period of the ranging cycle.

The second relates to the assignment of the user's uplink burst region.

The burst region of a user is assigned such that a plurality of users can transmit user data at the same period of time in an overlapping manner. When a wireless terminal moves at high speed, ICI (Inter Carrier Interface) is generated at Doppler shift. Therefore, in the case where the user's burst region is assigned such that a plurality of users can transmit user data at the same period of time in an overlapping manner in a high speed moving mode, the influence of the ICI will increase by the difference in the reception power between users, leading to degradation in the communication performance.

The third relates to channel estimation.

For a symbol including a pilot signal, the channel estimation value is calculated based on its pilot signal. For a symbol not including a pilot signal, the channel estimation value of an adjacent symbol is referred to. For example, the channel estimation value of a symbol not including a pilot signal is directly copied from the channel estimation value of an adjacent symbol and used. Since the distance across which a wireless terminal moves in one symbol becomes longer when the wireless terminal is moving at high speed, the error from the channel estimation value of an adjacent symbol will become greater. Therefore, if the channel estimation value of an adjacent symbol is directly copied to be used for a symbol that does not include a pilot signal in a high speed moving mode of the wireless terminal, the communication performance will be degraded.

The fourth relates to communication quality and MCS switching.

The communication quality is used to determine switching of the MCS (Modulation and Code Scheme). In order to improve the accuracy, the communication quality is calculated by averaging the measured values such as the CINR (Carrier to Interference plus Noise Ratio) of each frame over a plurality of frames. If the averaging process is carried out over such plurality of frames in a manner likewise with the normal mode when the wireless terminal is moving at high speed, the instantaneous variation at the current point in time cannot be established. As a result, the calculation accuracy of the communication quality, as well as MCS switching, will be degraded.

The above-described problems are also encountered in the OFDM scheme.

In view of the foregoing, an object of the present invention is to provide a wireless base station, a wireless terminal, a wireless relay station, and a wireless base station system that can appropriately switch the communication processing method according to the moving speed of the wireless terminal.

Solution to Problem

To solve the above-described problems, the present invention is directed to a wireless base station communicating with a plurality of wireless terminals by an OFDM scheme or OFDMA scheme. The wireless base station includes an identification unit identifying the moving speed of a wireless terminal currently in communication, a ranging control unit setting the transmission cycle of a ranging signal of a wireless terminal moving at a speed greater than or equal to a predetermined speed shorter than the transmission cycle of a ranging signal of a wireless terminal moving at a speed below the predetermined speed, a transmission unit transmitting a signal notifying the set ranging signal transmission cycle to the wireless terminal, and a reception unit receiving a ranging signal from the wireless terminal currently in communication.

The present invention is directed to a wireless base station communicating with a plurality of wireless terminals by an OFDM system or OFDMA system, including an identification unit identifying the moving speed of a wireless terminal currently in communication, and a communication quality measurement unit calculating communication quality of upstream user data from a wireless terminal according to a scheme corresponding to the moving speed of the wireless terminal.

Preferably, the communication quality measurement unit calculates the upstream or downstream communication quality based on upstream or downstream user data included in frames of a first number of frames for a wireless terminal moving at a speed below the predetermined speed, and based on upstream or downstream user data included in frames of a second number of frames for a wireless terminal moving at a speed greater than or equal to the predetermined speed. The second number of frames is lower than the first number of frames.

Preferably, the communication quality measurement unit calculates the upstream or downstream communication quality by weighted moving average of the CINR (Carrier to Interference plus Noise Ratio) of the upstream or downstream user data for each frame. For a wireless terminal moving at a speed greater than or equal to the predetermined speed, the communication quality measurement unit reduces the weight of previous frames than for a wireless terminal moving at a speed below the predetermined speed.

Preferably, the wireless base station includes an MCS setting unit setting the MCS (Modulation and Code Scheme) of upstream or downstream user data of a wireless terminal based on the calculated upstream or downstream communication quality, and a transmission unit transmitting a signal notifying the set MCS to a wireless terminal.

The present invention is directed to a wireless base station communicating with a plurality of wireless terminals by an OFDM scheme or OFDMA scheme, and includes an identification unit identifying a moving speed of a wireless terminal currently in communication, a burst region setting unit setting an upstream data burst region of each user such that upstream user data of a wireless terminal moving at a speed greater than or equal to the predetermined speed is not transmitted in an overlapping manner with upstream user data of another wireless terminal at a same period of time, and a transmission unit transmitting a signal notifying the set upstream data burst region to the wireless terminal.

Preferably, the wireless base station includes a memory storing information to identify whether each wireless terminal moves at a speed greater than or equal to the predetermined speed. The identification unit identifies the moving speed of a wireless terminal currently in communication based on the information in the memory.

The present invention is directed to a wireless terminal communicating with a wireless base station by an OFDM scheme or OFDMA scheme, and includes an identification unit identifying its own moving speed, a reception unit receiving downstream user data from the wireless base station, and a channel estimation unit calculating, when its own terminal is moving at a speed greater than or equal to the predetermined speed, a channel estimation value from a pilot signal included in downstream user data at a scheme of higher accuracy than when its own terminal is moving at a speed below the predetermined speed.

Preferably, the identification unit identifies the moving speed of its own terminal based on a signal from the wireless base station.

The present invention is directed to a wireless relay station relaying data communication between a wireless base station and a wireless terminal. The wireless relay station includes an identification unit identifying the moving speed of its own station, a reception unit receiving downstream user data towards its own station, transmitted from the wireless base station at an OFDM scheme or OFDMA scheme, and a channel estimation unit estimating, when its own station is moving at a speed greater than or equal to the predetermined speed, a channel estimation value from a pilot signal included in downstream user data at a scheme of higher accuracy than when its own station is moving at a speed below the predetermined speed.

The present invention is directed to a wireless base station system including a plurality of wireless base stations and a control station controlling the plurality of wireless base stations, communicating with a plurality of wireless terminals by an OFDM scheme or OFDMA scheme. The wireless base station system includes an identification unit identifying a moving speed of a wireless terminal currently in communication with any of the wireless base stations, a ranging control unit setting a transmission cycle of a ranging signal of a wireless terminal moving at a speed greater than or equal to a predetermined speed shorter than the transmission cycle of a ranging signal of a wireless terminal moving at a speed below the predetermined speed, a transmission unit transmitting to the wireless terminal a signal notifying the set ranging signal transmission cycle, and a reception unit receiving a ranging signal from a wireless terminal currently in communication. The identification unit is arranged at the control station. The transmission unit and reception unit are arranged at the wireless base station. The ranging control unit is arranged at either the control station or any of each wireless base station.

Advantageous Effects of Invention

According to the present invention, the communication processing scheme can be switched appropriately according to the moving speed of the wireless terminal.

BRIEF DESCRIPTION OF DRAWINGS

FIG. 5 represents an example of a ranging cycle.

FIG. 6 represents an example of a frame number table.

FIG. 7 represents an example of a communication level table.

FIG. 8 represents an example of an MCS switching table.

DESCRIPTION OF EMBODIMENTS

Embodiments of the present invention will be described hereinafter with reference to the drawings.

[First Embodiment]
(Configuration of Wireless Communication System)

Figure 1:
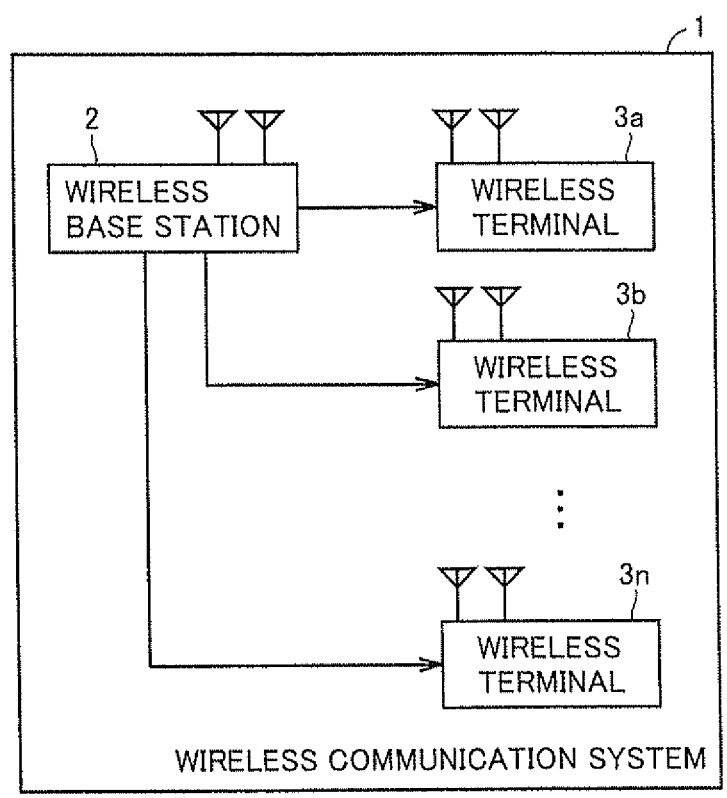
FIG. 1 represents a configuration of a wireless communication system according to a first embodiment of the present invention.

FIG. 1 represents a configuration of a wireless communication system according to a first embodiment of the present invention.

Referring to FIG. 1, a wireless communication system 1 includes a wireless base station 2, and a plurality of wireless terminals 3a-3n. Wireless communication is carried out between wireless base station 2 and wireless terminals 3a-3n by the OFDMA scheme. Hereinafter, any one of wireless terminals 3a-3n will be represented generically as wireless terminal 3.

(Configuration of Wireless Base Station)

Figure 2:
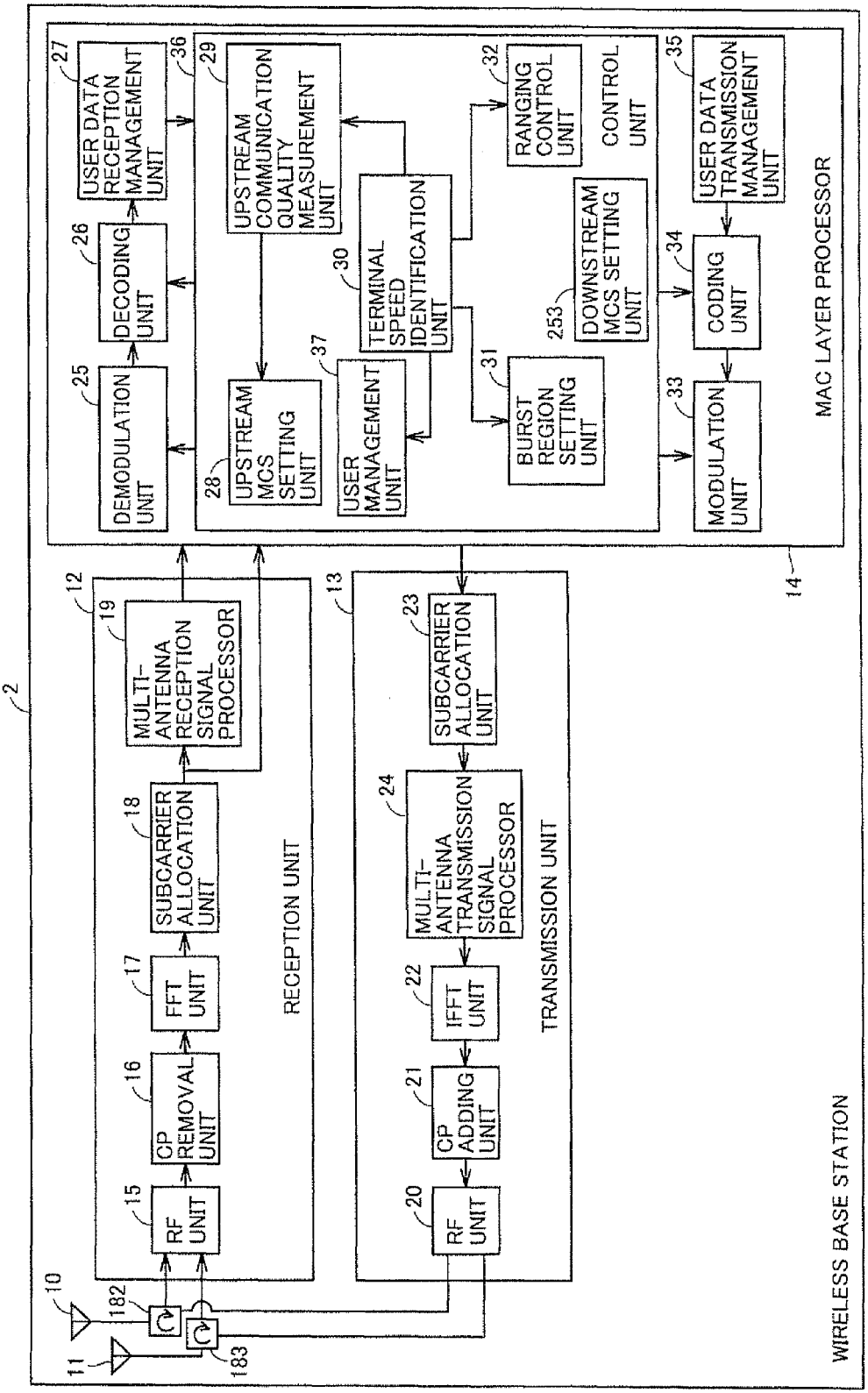
FIG. 2 represents a configuration of a wireless base station according to the first embodiment of the present invention.

FIG. 2 represents a configuration of a wireless base station according to the first embodiment of the present invention.

Referring to FIG. 2, wireless base station 2 includes a first antenna 10, a second antenna 11, a first couple/distributor 182, a second couple/distributor 183, a transmission unit 13, a reception unit 12, and an MAC (Media Access Control) layer processor 14.

First couple/distributor 182 is formed of a circulator, for example, and outputs a signal from transmission unit 13 to first antenna 10, and a signal from first antenna 10 to reception unit 12.

Second couple/distributor 183 is formed of a circulator, for example, to output a signal from transmission unit 13 to second antenna 11, and a signal from second antenna 11 to reception unit 12.

Transmission unit 13 includes a multi-antenna transmission signal processor 24, a subcarrier allocation unit 23, an IFFT (Inverse First Fourier Transform) unit 22, a CP (Cyclic Prefix) adding unit 21, and an RF (Radio Frequency) unit 20.

Subcarrier allocation unit 23 allocates a subcarrier based on, for example, PUSC (Partial Usage of Subchannels).

Multi-antenna transmission signal processor 24 subjects a plurality of data streams to spatial multiplexing.

IFFT unit 22 converts a plurality of subcarrier signals (signals in the frequency range) output from multi-antenna transmission signal processor 24 into a signal of the time region (OFDMA symbol) by IFFT.

CP adding unit 21 adds a signal equivalent to the tail of the OFDMA symbol to the head of the OFDMA symbol as the CP.

RF unit 20 includes an up converter for up-converting a radio frequency band, a power amplification circuit amplifying an up-converted signal, and a bandpass filter for passing only the signal component of a desired band among the amplified signals for output to first antenna 10 and second antenna 11.

Reception unit 12 includes an RF unit 15, a CP removal unit 16, a FFT (First Fourier Transform) unit 17, and a subcarrier allocation unit 18.

RF unit 15 includes a bandpass filter passing through only the signal component of a desired band among signals output from first antenna 10 and second antenna 11, a low-noise amplification circuit amplifying an RF signal, a down converter for down-converting an RF signal, and the like.

CP removal unit 16 removes the CP from the signal output from RF unit 15.

FFT unit 17 converts the signal in the time region output from CP removal unit 16 into a signal in the frequency range by FFT for demodulation of a plurality of subcarriers.

Subcarrier allocation unit 18 extracts each subcarrier output from FFT unit 17 based on, for example, PUSC.

MAC layer processor 14 includes a user data transmission management unit 35, a coding unit 34, a modulation unit 33, a demodulation unit 25, a decoding unit 26, a user data reception management unit 27, and a control unit 36. Control unit 36 includes a terminal speed identification unit 30, a user management unit 37, a burst region setting unit 31, a ranging control unit 32, an upstream communication quality measurement unit 29, an upstream MCS setting unit 28, and a downstream MCS setting unit 253.

User data transmission management unit 35 manages the user data transmitted to wireless terminal 3.

Coding unit 34 encodes the downstream user data to wireless terminal 3 according to the MCS coding rate set at downstream MCS setting unit 253.

Modulation unit 33 modulates the downstream user data to wireless terminal 3 according to the MCS modulation scheme set at downstream MCS setting unit 253.

Demodulation unit 25 demodulates the upstream user data from wireless terminal 3 according to the MCS modulation scheme set at upstream MCS setting unit 28.

Decoding unit 26 decodes the demodulated upstream user data according to the MCS coding rate set at upstream MCS setting unit 28.

User data reception management unit 27 manages the user data received from wireless terminal 3.

Terminal speed identification unit 30 calculates the reception response vector of each wireless terminal currently in communication. Terminal speed identification unit 30 estimates the Doppler frequency FD of each wireless terminal by calculating the correlation value of two or more reception response vectors differing in time of each wireless terminal. Terminal speed identification unit 30 also calculates the moving speed of each wireless terminal as a value proportional to the Doppler frequency. For more details of the principle in calculating the moving speed, refer to Japanese Patent Laying-Open No. 2003-32167, for example.

When wireless terminal 3 is moving at high speed, i.e. the moving speed is greater than or equal to a predetermined value, user management unit 37 sets the speed state of corresponding wireless terminal 3 at a high speed moving state. When wireless terminal 3 is not moving at high speed, i.e. the moving speed is below a predetermined value, user management unit 37 sets the moving state of corresponding wireless terminal 3 at the normal state. User management unit 37 notifies the set speed state of wireless terminal 3 via transmission unit 13.

Figure 3:
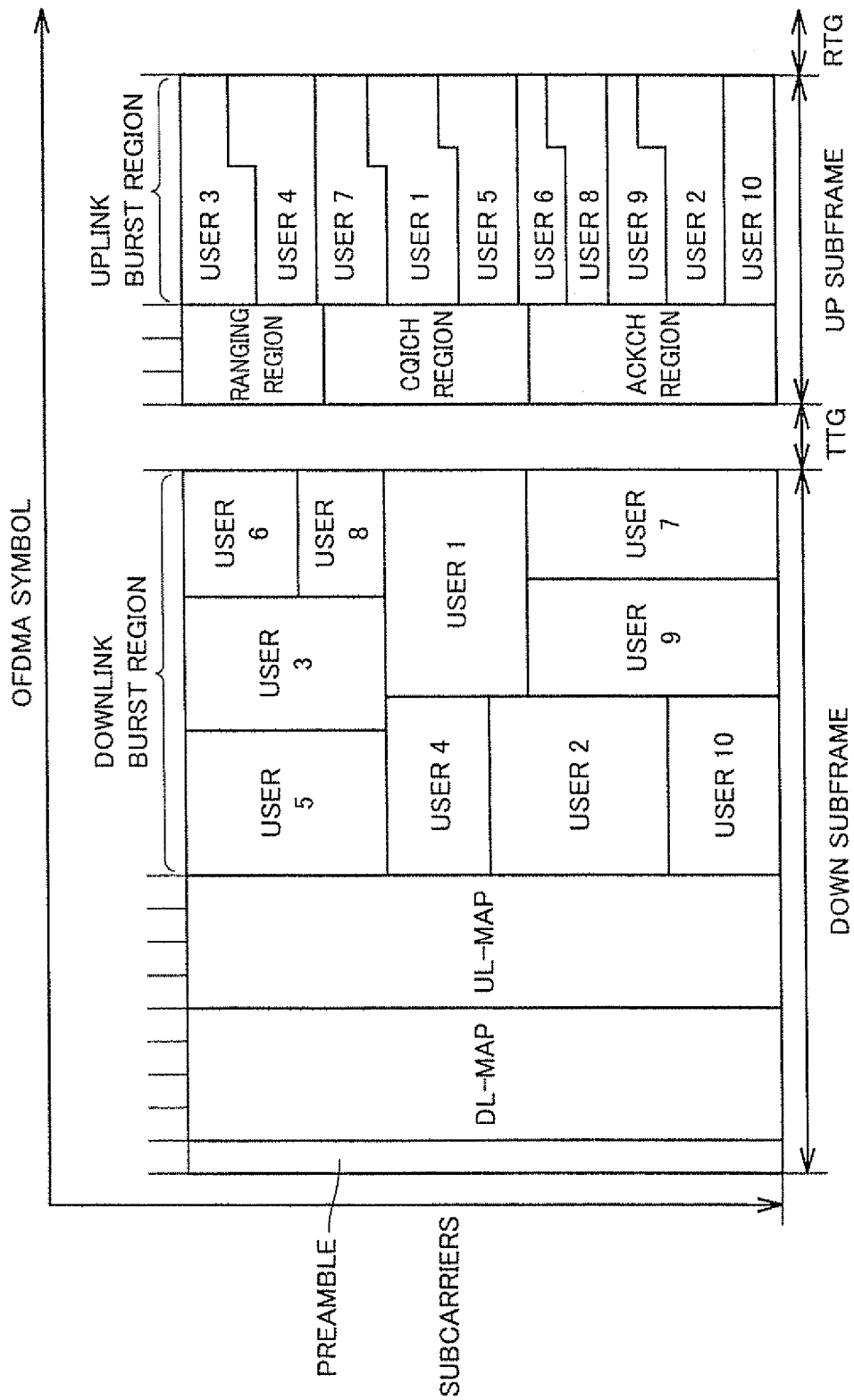
FIG. 3 represents a configuration of an OFDMA frame in a normal mode.
Figure 4:
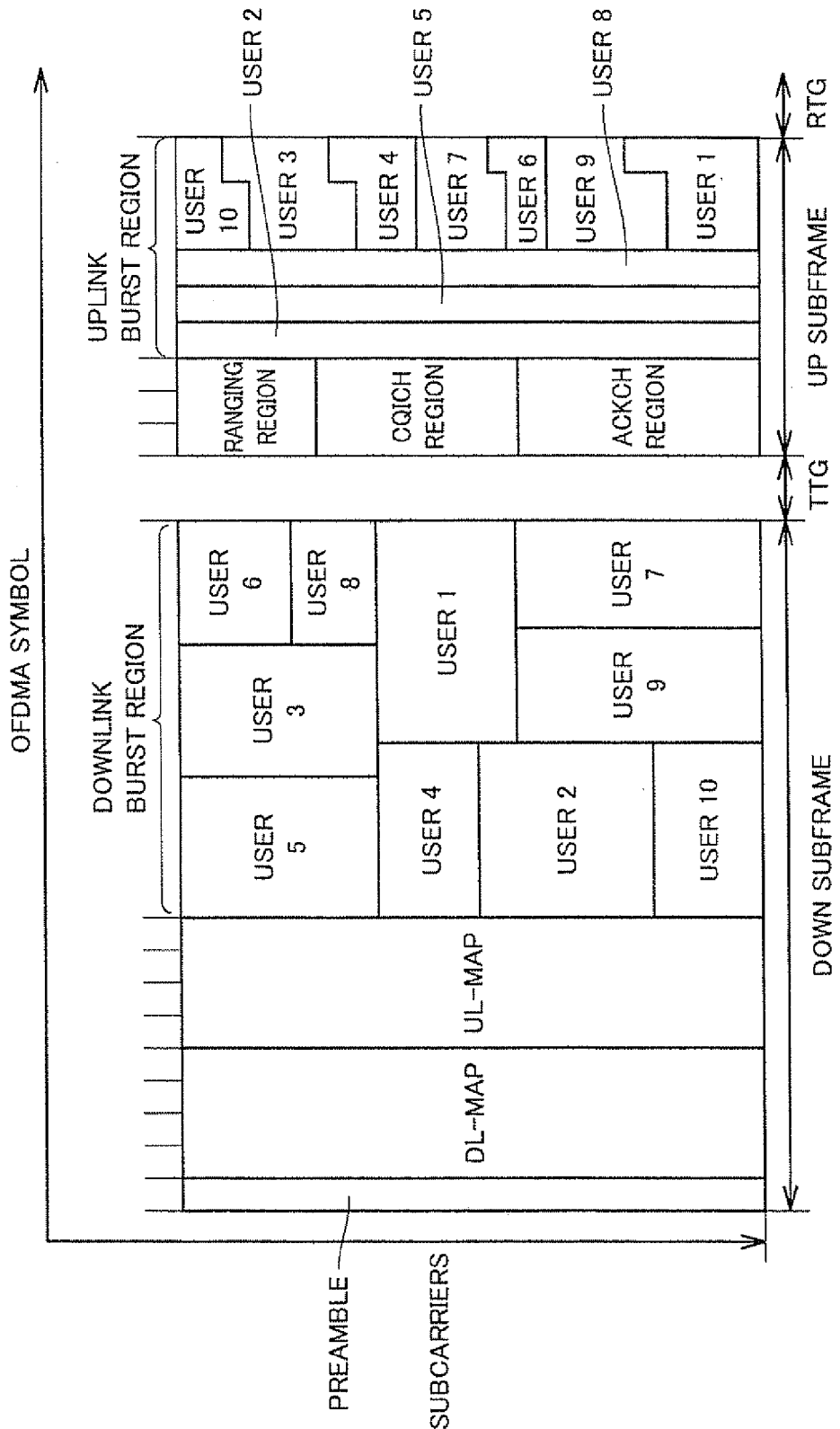
FIG. 4 represents a configuration of an OFDMA frame in a high speed moving mode.

FIG. 3 represents a configuration of an OFDMA frame in a normal mode. FIG. 4 represents a configuration of an OFDMA frame in a high speed moving mode.

Referring to FIGS. 3 and 4, an OFDMA frame includes a down subframe and an up subframe.

The down subframe includes a preamble, a DL-MAP (Downlink Map), an UL-MAP (Uplink Map), and a downlink burst region.

The preamble has a known signal arranged so as to establish synchronization and the like.

DL-MAP has the allocation information of a downlink wireless resource arranged. For example, information related to the burst region of downstream user data, ranging signal transmission cycle (ranging cycle), MCS of downstream user data, wireless terminal speed state, and the like is arranged in DL-MAP.

UL-MAP has allocation information of an upstream wireless resource arranged. For example, information such as the burst region of upstream user data, MCS of upstream user data, and the like is arranged in UL-MAP.

The downlink burst region has downstream user data arranged.

The up subframe includes a ranging region, a CQICH region, an ACKCH region, and an uplink burst region.

A ranging signal is arranged in the ranging region.

A signal representing the channel quality is arranged in the CQICH (channel quality information channel) region.

A signal representing the channel acknowledgement is arranged in the ACKCH (Acknowledgement Channel) region.

Upstream user data is arranged in the upstream burst region.

As shown in FIG. 3, when all the users are in a normal state, burst region setting unit 31 allows overlapping in time of each upstream user data with another user data within the uplink burst region for arrangement. Accordingly, a plurality of user data will be transmitted upstream in a mixed manner at the same period of time. For example, burst region setting unit 31 arranges the user data of user 1-user 10 overlapping in time. As a result, the user data of user 1-user 10 will be transmitted upstream in a mixed manner at the same period of time.

As shown in FIG. 4, when some or all of the users are in a high speed moving state, burst region setting unit 31 arranges the upstream user data of a wireless terminal in a high speed moving state without overlapping in time with another user data in the uplink burst region. Accordingly, user data corresponding to a high speed moving state will be transmitted upstream without being mixed with another user data at the same period of time. For example, in the case where user 2, user 5, and user 8 are moving at high speed, burst region setting unit 31 arranges the user data of user 2, user 5, and user 8 so as to avoid overlapping in time with another user data. As a result, the user data of user 2, user 5, and user 8 will be transmitted upstream without being mixed with another user data at the same period of time. The users other than user 2, user 5, and user 8 have the user data arranged, allowing overlapping in time with another user data since they are in a normal state. Burst region setting unit 31 notifies via transmission unit 13 the upstream user data burst region set at wireless terminal 3.

Ranging control unit 32 receives a ranging signal transmitted from each wireless terminal. The ranging signal is included in the ranging region of the up subframe shown in FIGS. 3 and 4. The cycle of the ranging signal being transmitted is called "ranging cycle". As shown in FIG. 5, it is assumed that a ranging cycle To in a normal mode is 30 frames, for example, and a ranging cycle Tf in a high speed moving mode is 5 frames, for example.

When wireless terminal 3 is moving at high speed, i.e. when the moving speed is greater than or equal to a predetermined value, ranging control unit 32 sets the ranging cycle of the relevant wireless terminal 3 at a cycle Tf (=5 frames, for example) corresponding to a high speed moving state. When wireless terminal 3 is not moving at high speed, i.e., when the moving speed is below a predetermined value, ranging control unit 32 sets the ranging cycle of the relevant wireless terminal 3 at the normal cycle To (=30 frames, for example). Ranging control unit 32 notifies the ranging cycle set at wireless terminal 3 via transmission unit 13.

Ranging control unit 32 transmits to each wireless terminal according to the ranging signal a ranging response including status information for notifying whether ranging is completed or not, and when ranging is further required, parameters to adjust the transmission timing of a signal from wireless terminal 3, the transmission frequency of a signal from wireless terminal 3, and the transmission power of a signal from wireless terminal 3.

Upstream communication quality measurement unit 29 switches the number of frames used in calculating the upstream communication quality according to the speed state of wireless terminal 3 based on the frame number table shown in FIG. 6. When the speed state of wireless terminal 3 is at a high speed moving state, upstream communication quality measurement unit 29 calculates the CINR of upstream user data of user i at each of the most recently received Nf (=4, for example) OFDMA frames. Upstream communication quality measurement unit 29 calculates the average value of the calculated Nf CINR values as upstream communication quality QL. When the speed state of wireless terminal 3 is at the normal state, upstream communication quality measurement unit 29 calculates the CINR of the upstream user data of user i at each of the most recently received No (=20, for example) OFDMA frames. Upstream communication quality measurement unit 29 calculates the average of the calculated No CINR values as upstream communication quality QL. The calculated upstream communication quality QL is used for the MCS setting of upstream user data.

FIG. 7 represents an example of a communication level table.

Referring to FIG. 7, the communication level table represents the relationship between the communication level and the upstream user data MCS.

For example, communication level "1" represents that the MCS is "QPSK 1/2", and the data rate is "1" (bit/symbol). "QPSK 1/2" indicates that the modulation scheme is QPSK, and the coding rate is 1/2.

FIG. 8 represents an example of an MCS switching table.

Referring to FIG. 8, the MCS switching table represents, for each MCS, the threshold value UP_TH of communication quality QL when the level is raised by one level, and the communication quality threshold value DN_TH when the MCS is lowered by one level.

Upstream MCS setting unit 28 raises and lowers by one level the MCS of upstream user data (upstream MCS) when upstream communication quality QL is greater than or equal to UP_TH and less than or equal to threshold value DN_TH, respectively. For example, in the case where the current MCS corresponds to "16 QAM 1/2", upstream MCS setting unit 28 raises and lowers the upstream MCS to set "16 QAM 3/4" and "QPSK 3/4" when upstream communication quality QL is greater than or equal to threshold value a3, and less than or equal to b2, respectively. Upstream MCS setting unit 28 notifies the upstream MCS set at corresponding wireless terminal 3 via transmission unit 13.

Downstream MCS setting unit 253 raises and lowers by one level the MCS of downstream user data (downstream MCS) when downstream communication quality QL transmitted from wireless terminal 3 is greater than or equal to UP_TH and less than or equal to threshold value DN_TH, respectively. Downstream MCS setting unit 253 notifies downstream MCS set at corresponding wireless terminal 3 via transmission unit 13.

(Configuration of Wireless Terminal)

Figure 9:
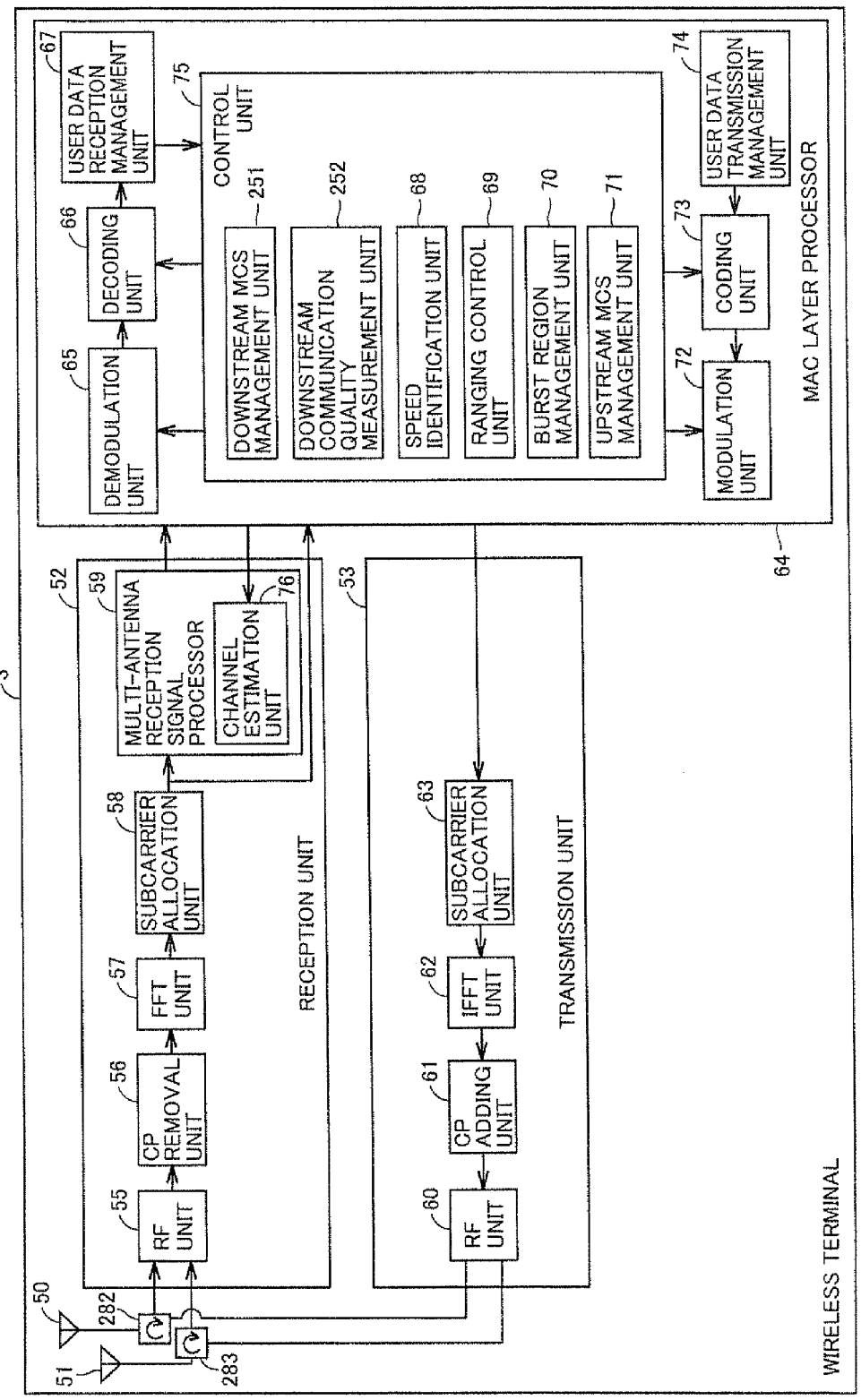
FIG. 9 represents a configuration of a wireless terminal according to the first embodiment of the present invention.

FIG. 9 represents a configuration of a wireless terminal according to the first embodiment of the present invention.

Referring to FIG. 9, wireless terminal 3 includes a first antenna 50, a second antenna 51, a first couple/distributor 282, a second couple/distributor 283, a transmission unit 53, a reception unit 52, and a MAC layer processor 64.

First couple/distributor 282 is formed of a circulator, for example, to output a signal from transmission unit 53 to first antenna 50, and a signal from first antenna 50 to reception unit 52.

Second couple/distributor 283 is formed of a circulator, for example, to output a signal from transmission unit 53 to second antenna 51, and a signal from second antenna 51 to reception unit 52.

Transmission unit 53 includes a subcarrier allocation unit 63, an IFFT unit 62, a CP adding unit 61, and an RF unit 60.

Subcarrier allocation unit 63 allocates a subcarrier based on, for example, PUSC.

IFFT unit 62 converts a plurality of subcarrier signals (signal in frequency range) output from subcarrier allocation unit 63 into signals of a time region (OFDMA symbol) by IFFT.

CP adding unit 61 adds a signal equivalent to the tail of the OFDMA symbol to the head of the OFDMA symbol as a CP.

RF unit 60 includes an up converter for up-converting a radio frequency band, a power amplification circuit amplifying an up-converted signal, and a bandpass filter for passing only the signal component of a desired band among the amplified signals for output to first antenna 50 and second antenna 51.

Reception unit 52 includes an RF unit 55, a CP removal unit 56, an FFT unit 57, a subcarrier allocation unit 58, and a multi-antenna reception signal processor 59.

RF unit 55 includes a bandpass filter passing through only the signal component of a desired band among signals output from first antenna 50 and second antenna 51, a low-noise amplification circuit amplifying an RF signal, a down converter for down-converting an RF signal, and the like.

CP removal unit 56 removes the CP from the signal output from RF unit 55.

FFT unit 57 converts the signal in the time region output from CP removal unit 56 into a signal in the frequency range by FFT for demodulation of a plurality of subcarriers.

Subcarrier allocation unit 58 extracts each subcarrier output from FFT unit 57 based on, for example, PUSC.

Multi-antenna reception signal processor 59 separates the signals output from two antennas 50 and 51 to extract a plurality of data streams.

MAC layer processor 64 includes a user data transmission management unit 74, a coding unit 73, a modulation unit 72, a demodulation unit 65, a decoding unit 66, a user data reception management unit 67, and a control unit 75. Control unit 75 includes an upstream MCS management unit 71, a downstream MCS management unit 251, a downstream communication quality measurement unit 252, a burst region management unit 70, a ranging control unit 69, and a speed identification unit 68.

User data transmission management unit 74 manages the user data to be transmitted to wireless base station 2.

Coding unit 73 encodes the upstream user data to wireless base station 2 according to the MCS coding rate set at upstream MCS management unit 71.

Modulation unit 72 modulates the encoded upstream user data according to the MCS modulation scheme set at upstream MCS management unit 71.

Demodulation unit 65 demodulates the downstream user data from wireless base station 2 according to the MCS modulation scheme set at downstream MCS management unit 251.

Decoding unit 66 decodes the demodulated downstream user data according to the MCS coding rate set at downstream MCS management unit 251.

User data reception management unit 67 manages the user data received from wireless base station 2.

Burst region management unit 70 sets and manages the upstream burst region of its own terminal, transmitted from wireless base station 2.

Speed identification unit 68 sets and manages the speed state of its own terminal transmitted from a wireless base station. Speed identification unit 68 instructs channel estimation unit 76 to execute either a channel estimation process corresponding to a high speed moving state or the normal channel estimation process according to the speed state of its own terminal.

Downstream communication quality measurement unit 252 switches the number of frames to be used in calculating the downstream communication quality according to the speed state of its own terminal based on the frame number table shown in FIG. 6. When the speed state of its own terminal is at a high speed moving state, downstream communication quality measurement unit 252 calculates the CINR of downstream user data at each of the most recently received Nf (=4, for example) OFDMA frames. Downstream communication quality measurement unit 252 calculates the average value of the calculated Nf CINR values as downstream communication quality QL. When the speed state of its own terminal is at the normal state, downstream communication quality measurement unit 252 calculates the CINR of the downstream user data at each of the most recently received No (=20, for example) OFDMA frames. Downstream communication quality measurement unit 252 calculates the average of the calculated No CINR values as downstream communication quality QL. The calculated downstream communication quality QL is used for the MCS setting of the downstream user data used on part of wireless base station 2.

Upstream MCS management unit 71 sets and manages the MCS of upstream user data of its own terminal transmitted from wireless base station 2.

Downstream MCS management unit 251 sets and manages the MCS of downstream user data of its own terminal transmitted from wireless base station 2.

Ranging control unit 69 transmits a ranging signal according to the ranging cycle transmitted from wireless base station 2. Ranging control unit 69 receives the ranging response transmitted from wireless base station 2. When the status of the ranging response indicates that further adjustment is required, ranging control unit 69 adjusts the signal transmission timing, signal transmission frequency, and signal transmission power according to the parameters in the ranging response.

Channel estimation unit 76 calculates the channel estimation value for a wireless terminal in a high speed moving state from the pilot signal included in the downstream user data at a scheme of higher accuracy than for a wireless terminal of the normal state.

Channel estimation by channel estimation unit 76 will be described hereinafter.

Figure 10:
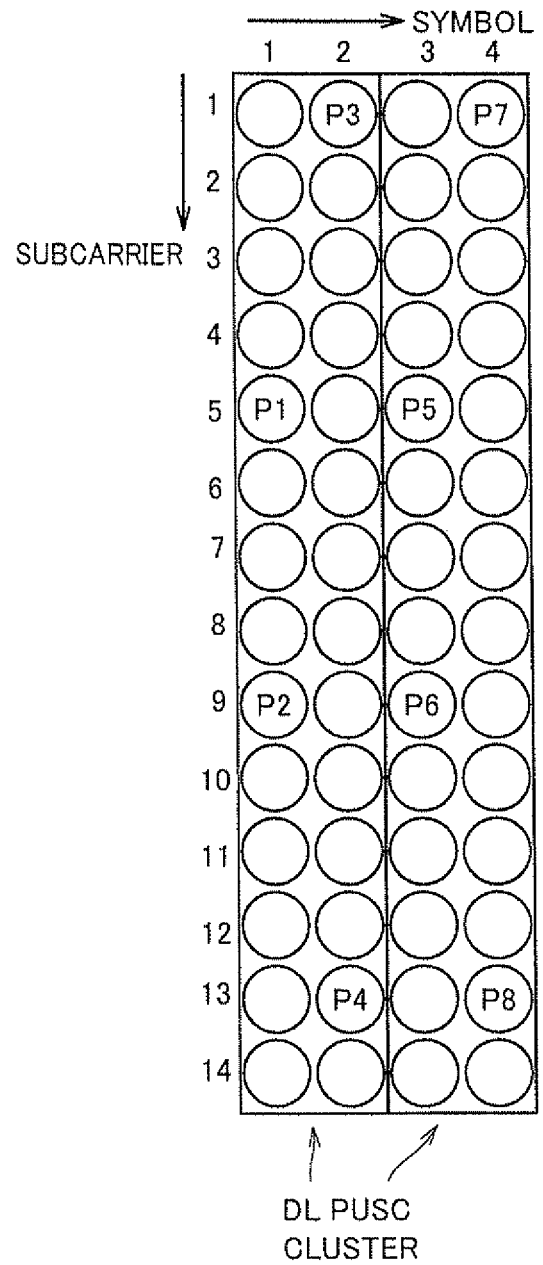
FIG. 10 represents an arrangement of pilot signals.

FIG. 10 represents an arrangement of pilot signals.

Referring to FIG. 10, the downlink PUSC cluster where downlink user data is arranged is depicted. Two symbols and fourteen subcarriers constitute one PUSC cluster. A pilot signal is transferred with two subcarriers per symbol.

Figure 11:
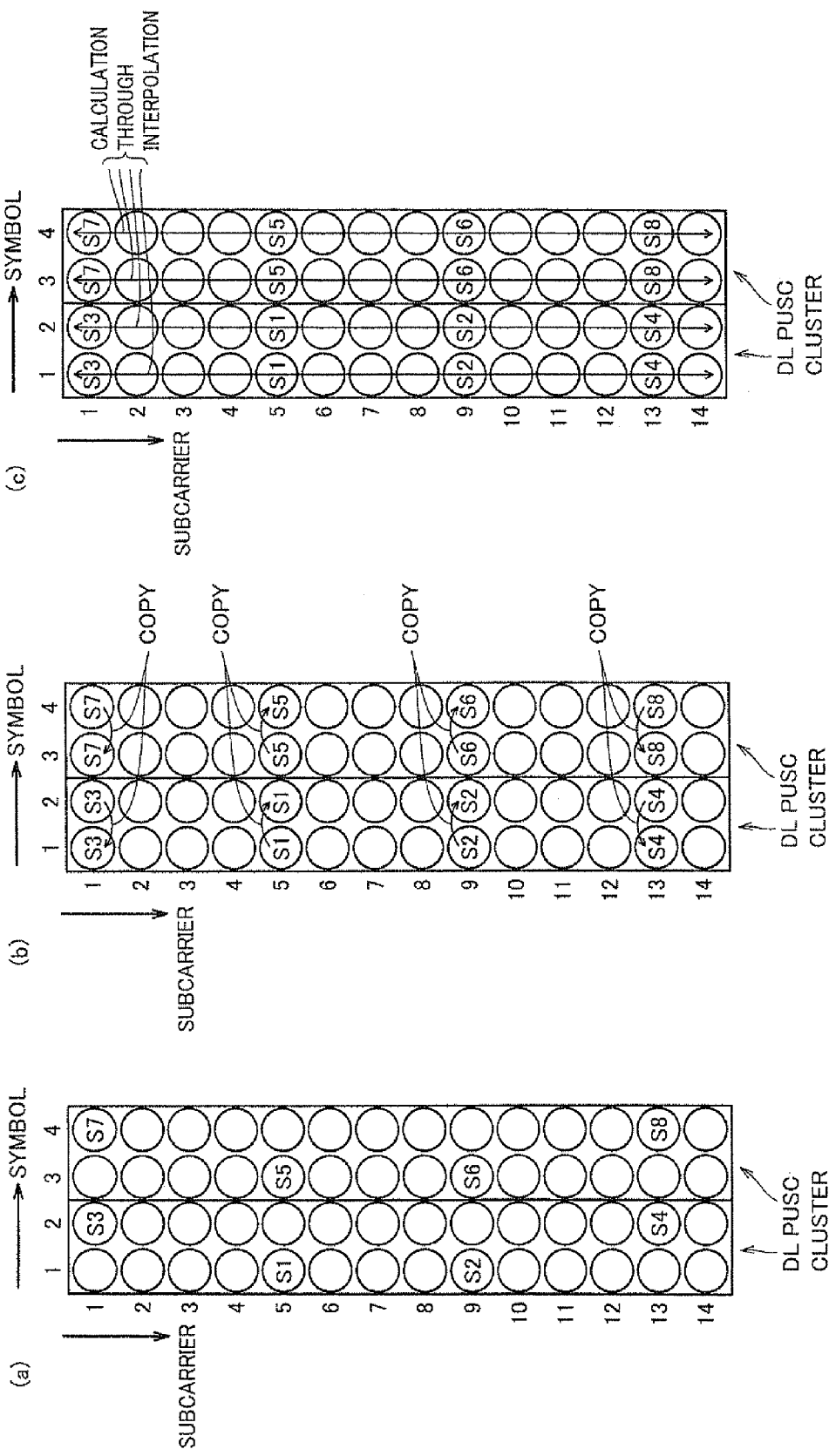
FIG. 11 is a diagram to describe a channel estimation process in a normal mode.

FIG. 11 is a diagram to describe a channel estimation process in a normal mode.

As shown in FIG. 11(a), channel estimation unit 76 calculates a channel estimation value S1 of the first symbol and fifth subcarrier by dividing pilot signal P1 included in the first symbol and fifth subcarrier by a known signal. Similarly, channel estimation unit 76 calculates a second channel estimation value S2 of the first symbol and the ninth subcarrier, a channel estimation value S3 of the second symbol and first subcarrier, a channel estimation value S4 of the second symbol and thirteenth subcarrier, a channel estimation value S5 of the third symbol and fifth subcarrier, a channel estimation value S6 of the third symbol and ninth subcarrier, a channel estimation value S7 of the fourth symbol and first subcarrier, and a channel estimation value S8 of the fourth symbol and thirteenth subcarrier.

As shown in FIG. 11(b), channel estimation unit 76 copies channel estimation value S3 of the first subcarrier and second symbol as the channel estimation value of the first subcarrier and first symbol. Channel estimation unit 76 copies channel estimation value S7 of the first subcarrier and fourth symbol as the channel estimation value of the first subcarrier and third symbol. Channel estimation unit 76 copies channel estimation value S1 of the fifth subcarrier and first symbol as the channel estimation value of the fifth subcarrier and second symbol. Channel estimation unit 76 copies channel estimation value S5 of the fifth subcarrier and third symbol as the channel estimation value of the fifth subcarrier and fourth symbol. Channel estimation unit 76 copies channel estimation value S2 of the ninth subcarrier and first symbol as the channel estimation value of the ninth subcarrier and second symbol. Channel estimation unit 76 copies channel estimation value S6 of the ninth subcarrier and third symbol as the channel estimation value of the ninth subcarrier and fourth symbol. Channel estimation unit 76 copies channel estimation value S4 of the thirteenth subcarrier and second symbol as the channel estimation value of the thirteenth subcarrier and first symbol. Channel estimation unit 76 copies channel estimation value S8 of the thirteenth subcarrier and fourth symbol as the channel estimation value of the thirteen subcarrier and third symbol.

As shown in FIG. 11(c), channel estimation unit 76 uses the calculated channel estimation values S3, S1, S2 and S4 to determine the coefficients of a third-degree equation representing the relationship between a subcarrier and channel estimation value by the least square method, and then uses the calculated third-degree equation to calculate the channel estimation values of the remaining subcarriers, for the first symbol. For the second, third and fourth symbols, channel estimation unit 76 calculates the channel estimation values of the remaining subcarriers in a similar manner.

Figure 12:
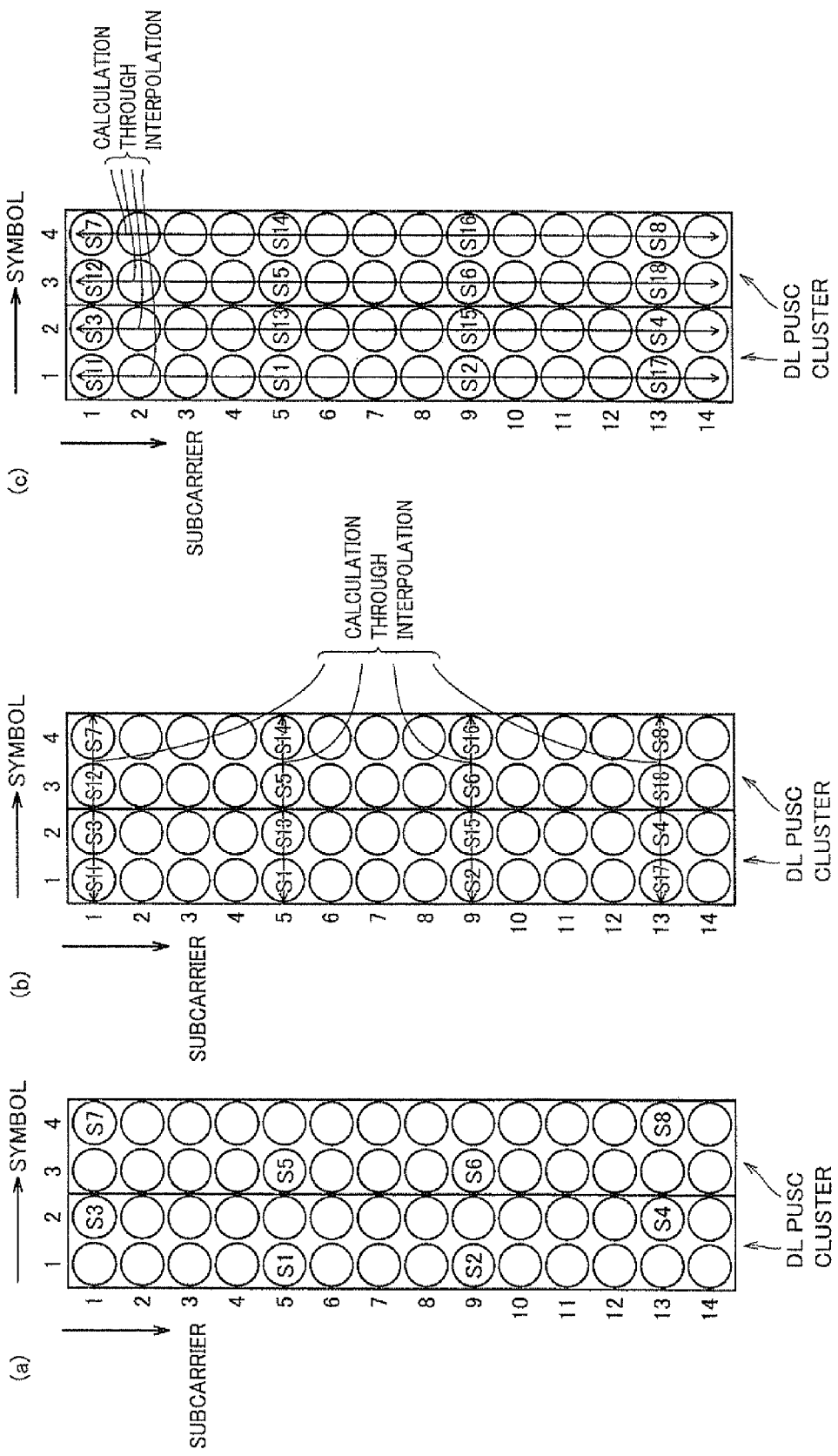
FIG. 12 is a diagram to describe a channel estimation process corresponding to high speed moving.

FIG. 12 is a diagram to describe a channel estimation process corresponding to high speed moving.

As shown in FIG. 12(a), channel estimation unit 76 calculates channel estimation values S1-S8 in a manner similar to that of the normal mode, as shown in FIG. 11(a).

As shown in FIG. 12(b), channel estimation unit 76 uses channel estimation value S3 of the first subcarrier and second symbol and channel estimation value S7 of the fourth symbol to calculate the coefficients of a first-degree equation representing the relationship between a subcarrier and a channel estimation value, and then uses the calculated first-degree equation to determine a channel estimation value S11 of the first symbol and a channel estimation value S12 of the third symbol. In a similar manner for the fifth subcarrier, channel estimation unit 76 calculates channel estimation values S13 and S14. In a similar manner for the ninth subcarrier, channel estimation unit 76 calculates channel estimation values S15 and S16. In a similar manner for the thirteenth subcarrier, channel estimation unit 76 calculates channel estimation values S17 and S18.

As shown in FIG. 12(c), channel estimation unit 76 uses the calculated channel estimation values S11, S1, S2 and S17 to determine the coefficients of a third-degree equation representing the relationship between a subcarrier and channel estimation value by the least square method, and then uses the calculated third-degree equation to calculate the channel estimation values of the remaining subcarriers, for the first symbol. For the second, third and fourth symbols, channel estimation unit 76 calculates the channel estimation values of the remaining subcarriers in a similar manner.

(Operation of Wireless Base Station)

Figure 13:
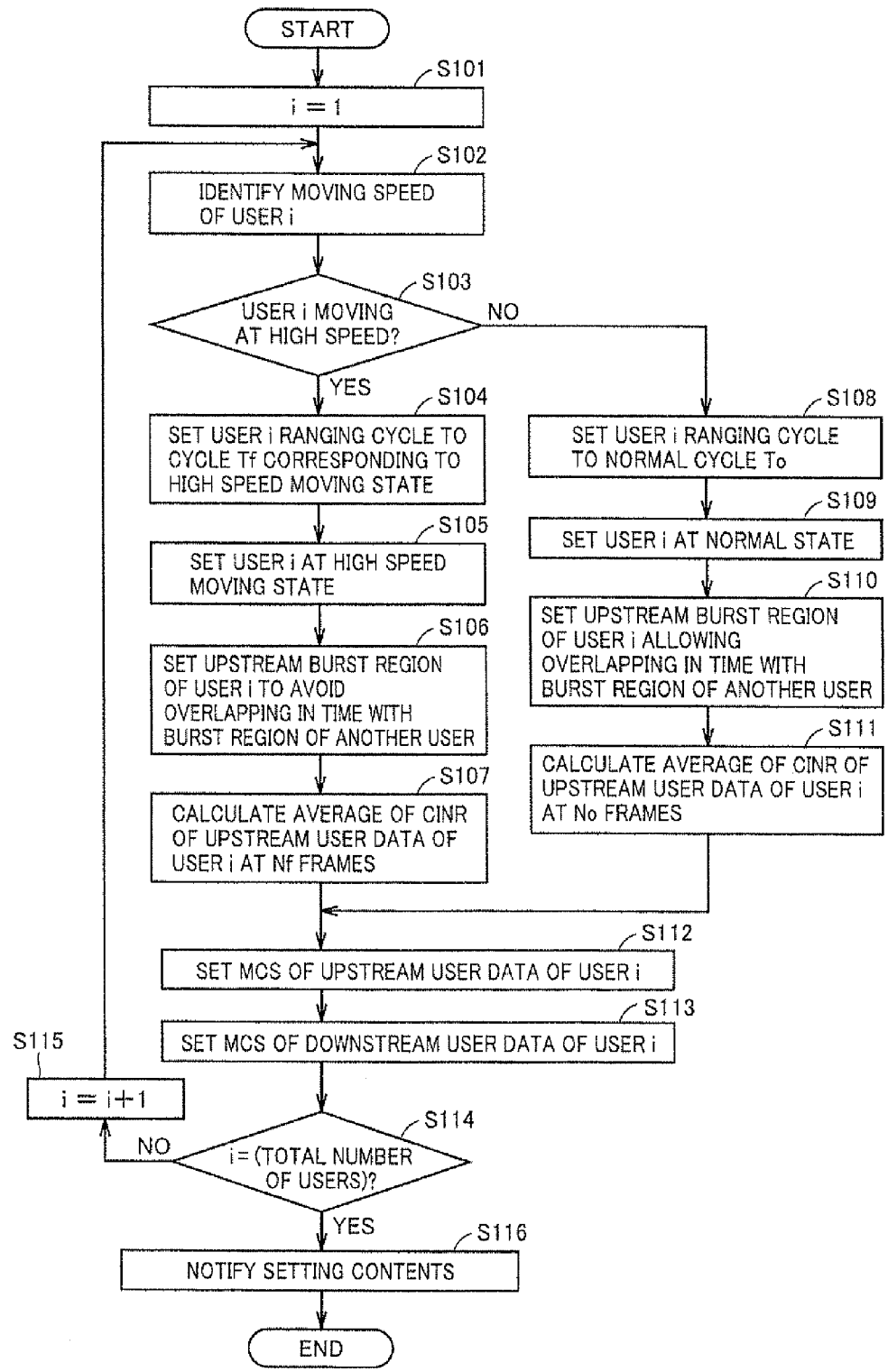
FIG. 13 is a flowchart representing an operation procedure of a wireless base station according to the first embodiment of the present invention.

FIG. 13 is a flowchart representing an operation procedure of a wireless base station according to the first embodiment of the present invention. The processing is carried out according to this flowchart for every frame.

Referring to FIG. 13, the user number is set at 1 (step S101).

Terminal speed identification unit 30 identifies the moving speed of wireless terminal 3 of user i based on two or more reception response vectors differing in time of the wireless terminal of user i (step S102).

When wireless terminal 3 of user i is moving at high speed, i.e. the moving speed is greater than or equal to a predetermined value (YES at step S103), ranging control unit 32 sets the ranging cycle of wireless terminal 3 of user i at frequency Tf for high speed moving (=5 frames, for example) (step S104). User management unit 37 sets the speed state of wireless terminal 3 of user i at a high speed moving state (step S105). Burst region setting unit 31 sets the burst region of the upstream user data of user i so as to avoid overlapping in time with a burst region of another user (step S106). Upstream communication quality measurement unit 29 calculates the CINR of upstream user data of wireless terminal 3 of user i in each of the most recently received Nf (=for example, 4 frames) OFDMA frames. Upstream communication quality measurement unit 29 calculates the average of the calculated Nf CINR values as upstream communication quality QL (step S107).

When wireless terminal 3 of user i is not moving at high speed, i.e. the moving speed is below the predetermined value (NO at step S103), ranging control unit 32 sets the ranging cycle of wireless terminal 3 of user i at the normal frequency To (=30 frames, for example) (step S108). Further, user management unit 37 sets the speed state of wireless terminal 3 of user i at the normal state (step S109). Burst region setting unit 31 sets the burst region of the upstream user data of user i allowing overlapping with the burst region of another user in time (step S110). Upstream communication quality measurement unit 29 calculates the CINR of upstream user data of wireless terminal 3 of user i in each of the most recently received No (=20, for example) OFDMA frames. Upstream communication quality measurement unit 29 calculates the average of the calculated No CINR values as upstream communication quality QL (step S111).

Then, upstream MCS setting unit 28 refers to the MCS switching table of FIG. 8 to set the upstream MCS based on upstream communication quality QL. Demodulation unit 25 demodulates the user data at the MCS modulation scheme set at upstream MCS setting unit 28. Decoding unit 26 decodes the user data at the MCS coding rate set at upstream MCS setting unit 28 (step S112).

Then, downstream MCS setting unit 253 refers to the MCS switching table of FIG. 8 to set downstream MCS based on downstream communication quality QL. Coding unit 34 encodes the user data at the MCS coding rate set at downstream MCS setting unit 253. Modulation unit 33 modulates the user data at the MCS modulation scheme set at downstream MCS setting unit 253 (step S113).

When user number i is not equal to the total number of users currently in communication (NO at step S114), the user number is incremented by 1 (step S115), and control returns to step S102. When user number i is equal to the total number of users currently in communication (YES at step S114), transmission unit 13 uses DL-MAP and UL-MAP of the downlink frame to notify the above-described contents that are set (step S116).

(Operation of Wireless Terminal)

Figure 14:
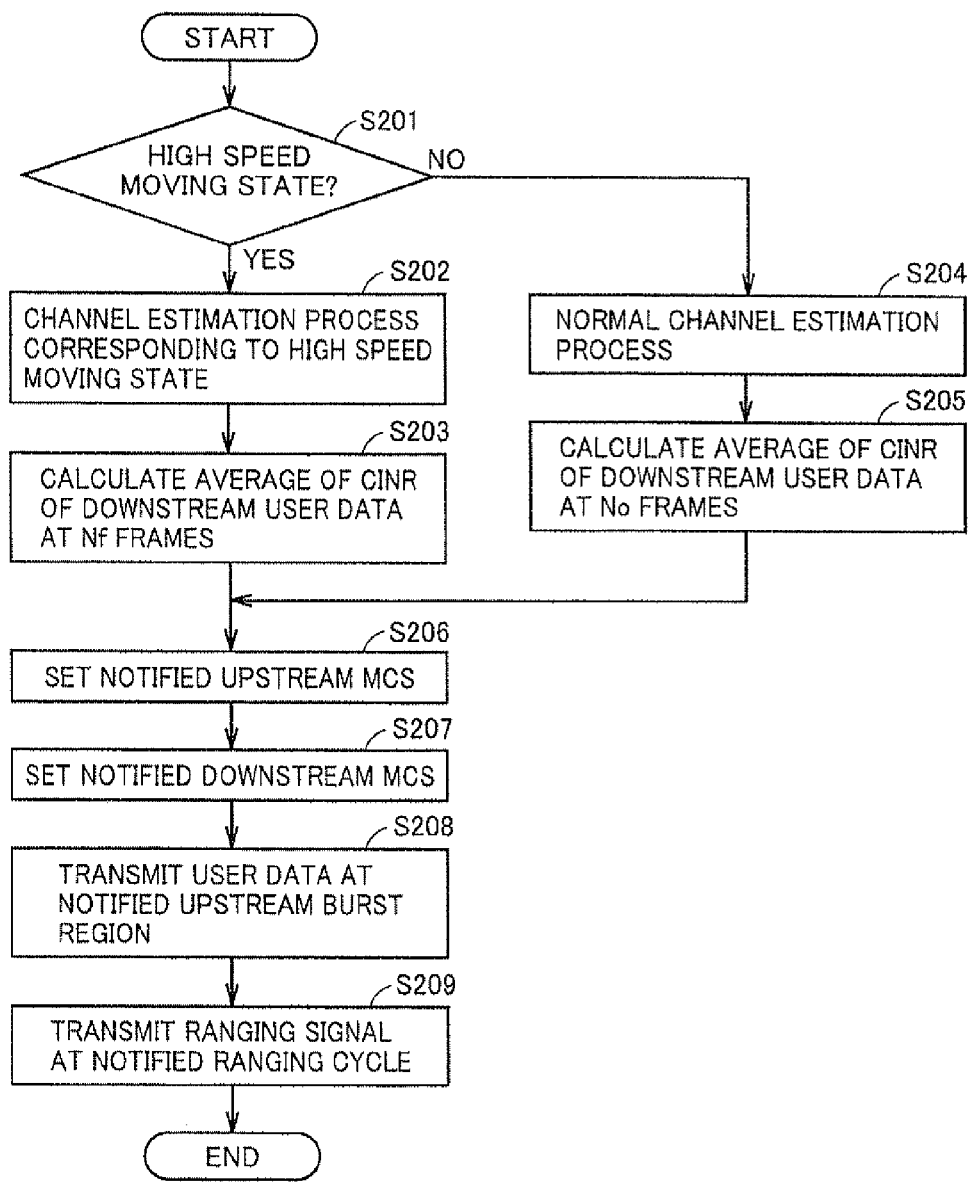
FIG. 14 is a flowchart representing an operation procedure of a wireless terminal according to the first embodiment of the present invention.

FIG. 14 is a flowchart representing an operation procedure of a wireless terminal according to the first embodiment of the present invention. The processing according to this flowchart is carried out for every frame.

Referring to FIG. 14, when speed identification unit 68 of wireless terminal 3 is notified that the speed state of its own terminal is at a high speed state from wireless base station 2 (YES at step S201), channel estimation unit 76 is made to execute the high speed moving channel estimation process, as described with reference to FIG. 12 (step S202). Further, downstream communication quality measurement unit 252 calculates the CINR of downstream user data of its own terminal at each of the most recently received Nf (=4, for example) OFDMA frames. Downstream communication quality measurement unit 252 calculates the average of the calculated Nf CINR values as downstream communication quality QL (step S203).

When speed identification unit 68 is notified that the speed state of its own terminal is at a normal state from wireless base station 2 (NO at step S201), channel estimation unit 76 is made to execute the normal channel estimation process, as described with reference to FIG. 11 (step S204). Further, downstream communication quality measurement unit 252 calculates the CINR of the downlink user data of its own terminal at each of the most recently received No (=20, for example) OFDMA frames. Downstream communication quality measurement unit 252 calculates the average of the calculated No CINR values as downstream communication quality QL (step S205).

Upstream MCS management unit 71 sets the upstream MCS notified from wireless base station 2. Coding unit 73 encodes the user data at the MCS coding rate set at upstream MCS management unit 71. Modulation unit 72 modulates the user data at the MCS modulation scheme set at upstream MCS management unit 71 (step S206).

Downstream MCS management unit 251 sets the downstream MCS notified from wireless base station 2. Demodulation unit 65 demodulates the user data by the MCS modulation scheme set at downstream MCS management unit 251. Decoding unit 66 decodes the user data at the MCS coding rate set at downstream MCS management unit 251 (step S207).

Burst region management unit 70 sets the burst region of the upstream user data notified from wireless base station 2. Transmission unit 53 transmits the user data using the burst region set at burst region management unit 70 (step S208).

Then, ranging control unit 69 transmits a ranging signal to wireless base station 2 at the ranging cycle notified from wireless base station 2 (step S209).

How the processing set forth above is carried out in cooperation between a wireless base station and a wireless terminal will be described hereinafter.

(Channel Estimation)

Figure 15:
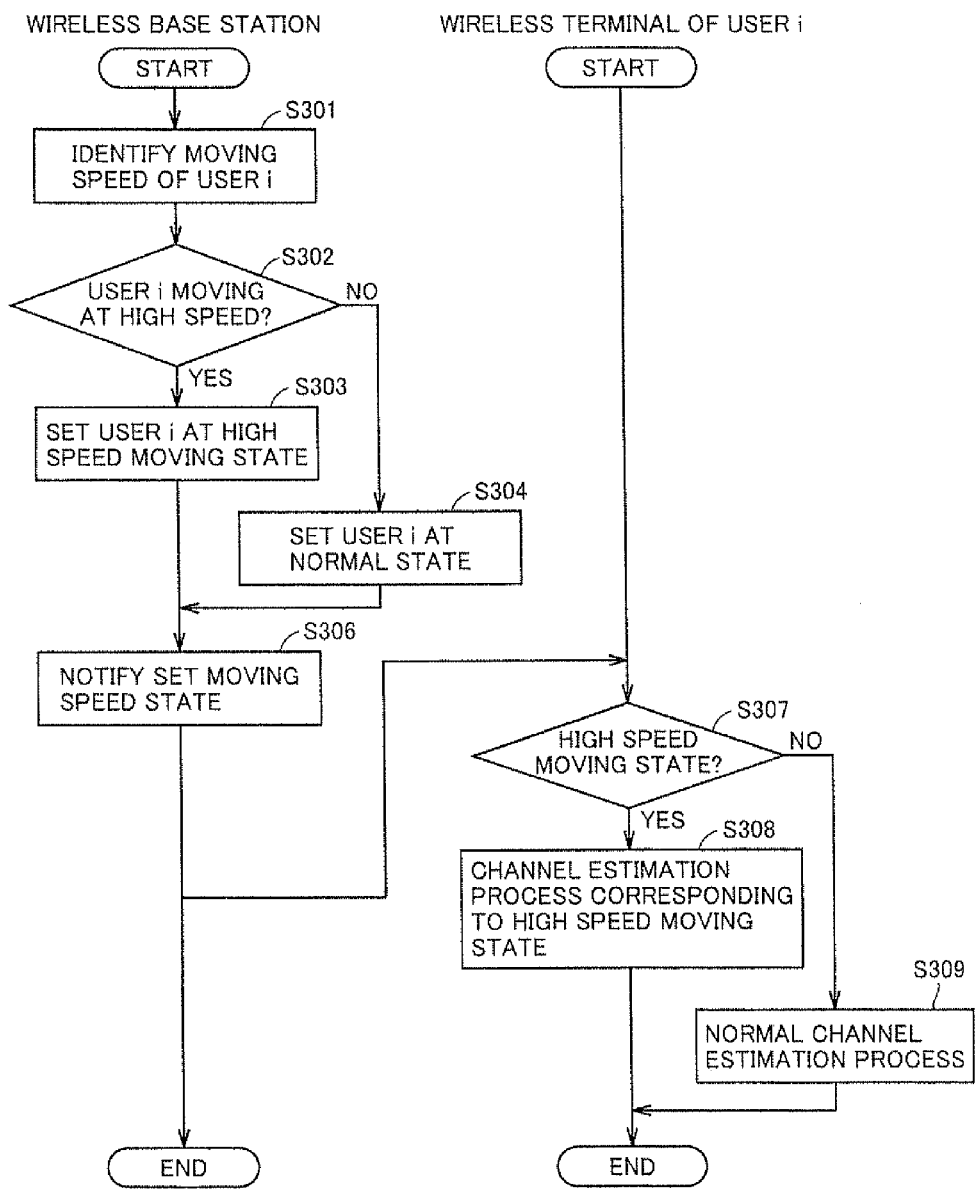
FIG. 15 is a flowchart representing a channel estimation procedure of a wireless communication system according to the first embodiment of the present invention.

FIG. 15 is a flowchart representing a channel estimation procedure of the wireless communication system according to the first embodiment of the present invention. FIG. 15 represents the channel estimation procedure at a wireless terminal of user i.

Referring to FIG. 15, terminal speed identification unit 30 of wireless base station 2 identifies the moving speed of wireless terminal 3 of user i based on two or more reception response vectors differing in time of the wireless terminal of user i (step S301).

When wireless terminal 3 of user i is moving at high speed, i.e. the moving speed is greater than or equal to a predetermined value (YES at step S302), user management unit 37 of wireless base station 2 sets the speed state of wireless terminal 3 of user i at a high speed moving state (step S303). When wireless terminal 3 of user i is not moving at high speed, i.e. the moving speed is below the predetermined value (NO at step S302), user management unit 37 sets the speed state of wireless terminal 3 of user i at the normal state (step S304).

Then, user management unit 37 notifies wireless terminal 3 of user i of the set speed state via transmission unit 13. Transmission unit 13 transmits the data representing the set speed state of user i using a portion of the region of DL-MAP of OFDMA (step S306).

When speed identification unit 68 of wireless terminal 3 of user i is notified that the speed state of its own terminal is at the high speed moving state (YES at step S307), channel estimation unit 76 is made to execute the channel estimation processing for high speed moving, as described with reference to FIG. 12 (step S308).

When speed identification unit 68 is notified that the speed state of its own terminal is at the normal state (NO at step S307), channel estimation unit 76 is made to execute the normal channel estimation process, as described with reference to FIG. 11 (step S309).

(Estimation of Upstream MCS)

Figure 16:
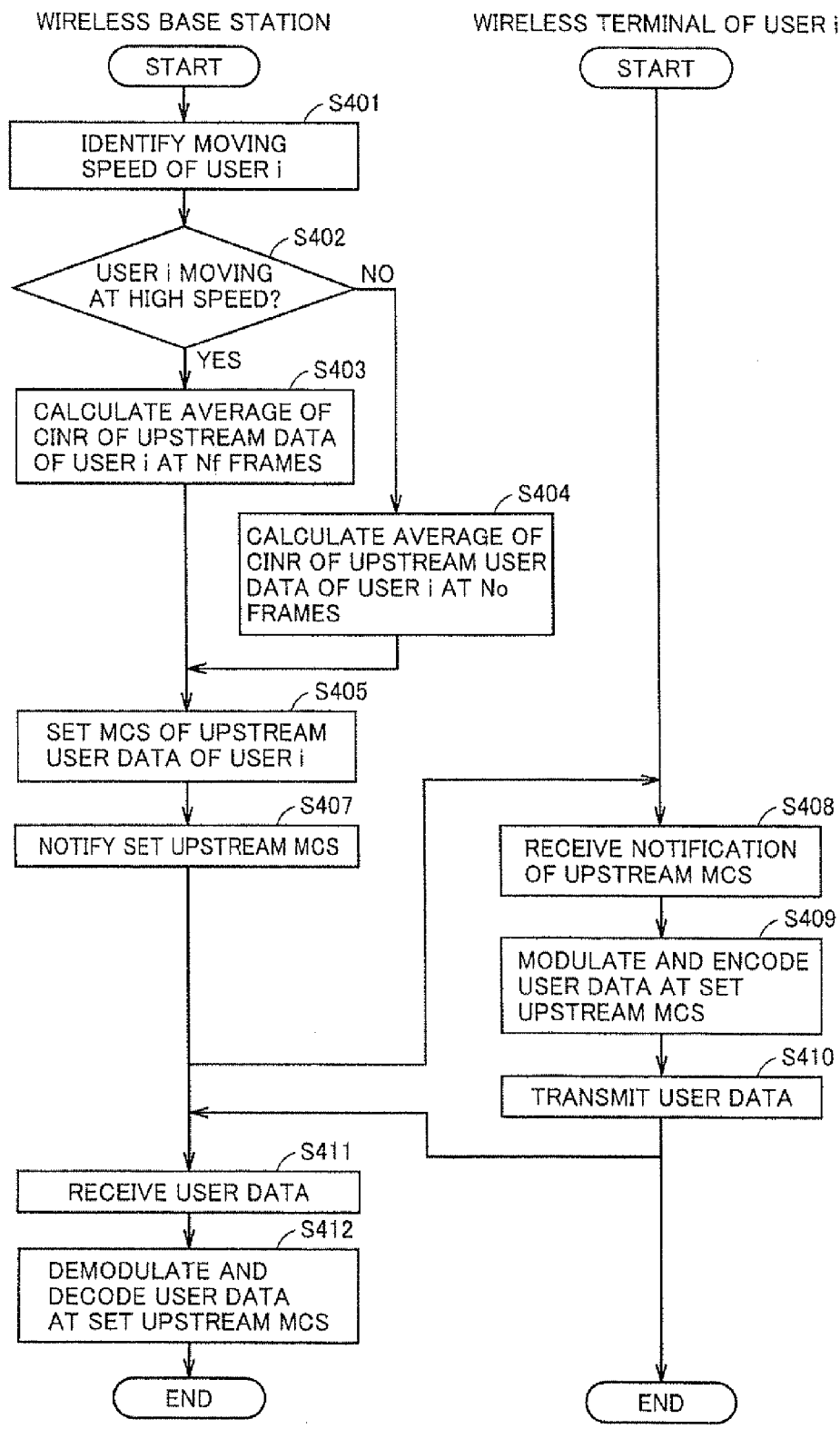
FIG. 16 is a flowchart representing an upstream MCS setting procedure of a wireless communication system according to the first embodiment of the present invention.

FIG. 16 is a flowchart representing an upstream MCS setting procedure of the wireless communication system according to the first embodiment of the present invention. FIG. 16 represents the upstream MCS estimation procedure at a wireless terminal of user i.

Referring to FIG. 16, terminal speed identification unit 30 of wireless base station 2 identifies the moving speed of wireless terminal 3 of user i based on two or more reception response vectors differing in time of the wireless terminal of user i (step S401).

When wireless terminal 3 of user i is moving at high speed, i.e. the moving speed is greater than or equal to a predetermined value (YES at step S402), upstream communication quality measurement unit 29 of wireless base station 2 calculates the CINR of upstream user data of wireless terminal 3 of user i at each of the most recently received Nf (=4, for example) OFDMA frames. Upstream communication quality measurement unit 29 calculates the average value of the calculated Nf CINR values as upstream communication quality QL (step S403).

When wireless terminal 3 of user i is not moving at high speed, i.e. the moving speed is below the predetermined value (NO at step S402), upstream communication quality measurement unit 29 calculates the CINR of upstream user data of wireless terminal 3 of user i in each of the most recently received No (=20, for example) OFDMA frames. Upstream communication quality measurement unit 29 calculates the average of the calculated No CINR values as upstream communication quality QL (step S404).

Then, upstream MCS setting unit 28 raises the MCS of the upstream user data (upstream MCS) of wireless terminal 3 of user i by one level when upstream communication quality QL is greater than or equal to threshold value UP_TH, and lowers the MCS of the upstream user data of user i by one level when upstream communication quality QL is less than or equal to threshold value DN_TH, according to the MCS switching table of FIG. 8 (step S405).

Upstream MCS setting unit 28 notifies wireless terminal 3 of user i about the set MCS of upstream user data via transmission unit 13. Transmission unit 13 transmits the data representing the MCS set at wireless terminal 3 of user i using a portion of the region of UL_MAP of OFDMA (step S407).

Upon receiving notification of the MCS of the upstream user data via reception unit 52, upstream MCS management unit 71 of wireless terminal 3 of user i sets the MCS for management to the notified one (step S408).

Coding unit 73 encodes the user data at the MCS coding rate set at upstream MCS management unit 71. Modulation unit 72 modulates the user data at the MCS modulation scheme set at upstream MCS management unit 71. Transmission unit 53 of wireless terminal 3 of user i transmits the encoded and modulated user data to wireless base station 2 (step S409).

Reception unit 12 of the wireless base station receives the encoded and modulated user data from wireless terminal 3 of user i (step S411).

Demodulation unit 25 of wireless base station 2 demodulates the user data at the MCS modulation scheme set at upstream MCS setting unit 28. Decoding unit 26 of wireless base station 2 decodes the user data at the MCS coding rate set at upstream MCS setting unit 28 (step S412).

(Estimation of Downstream MCS)

Figure 17:
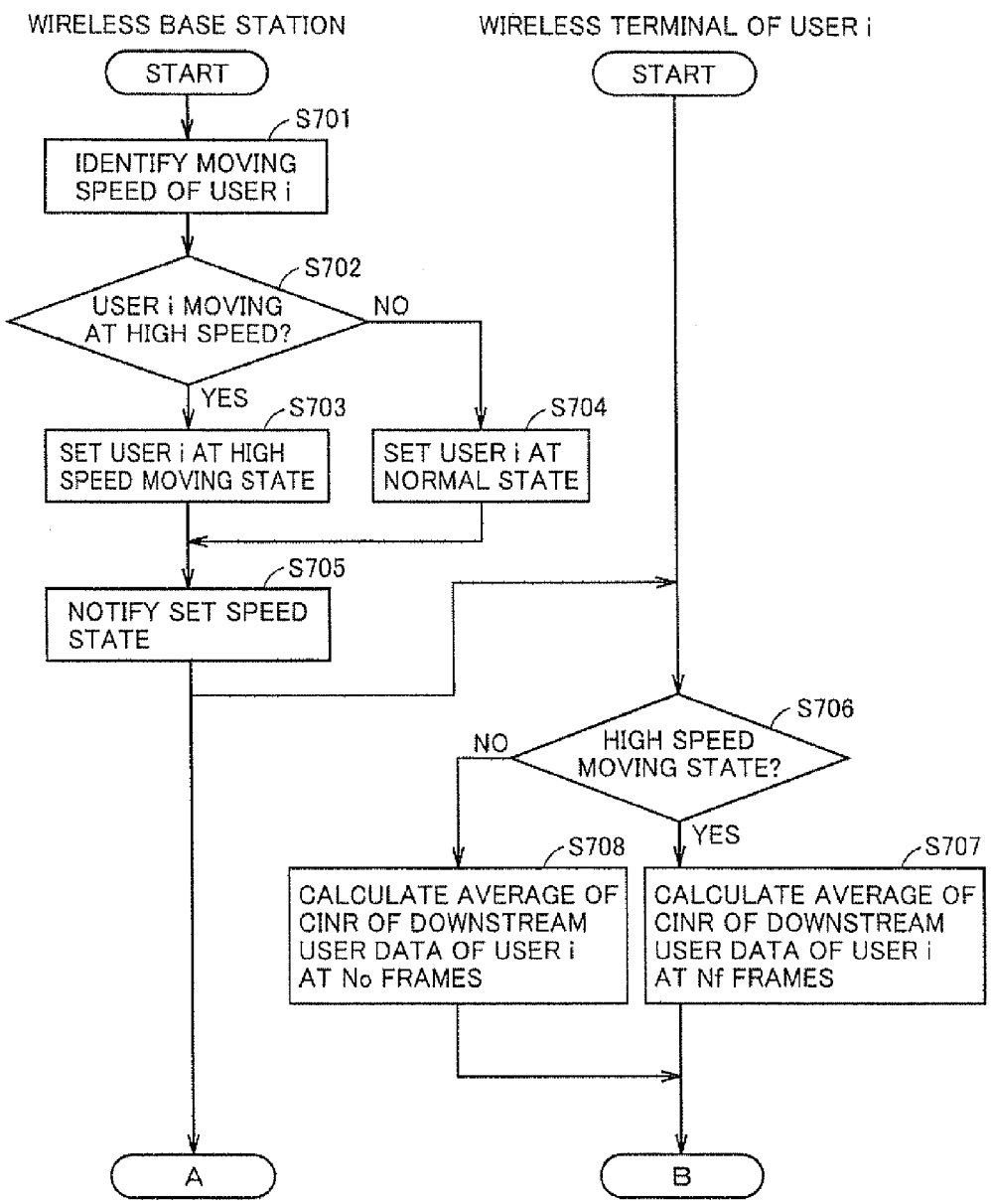
FIG. 17 is a flowchart representing a downstream MCS setting procedure of a wireless communication system according to the first embodiment of the present invention.
Figure 18:
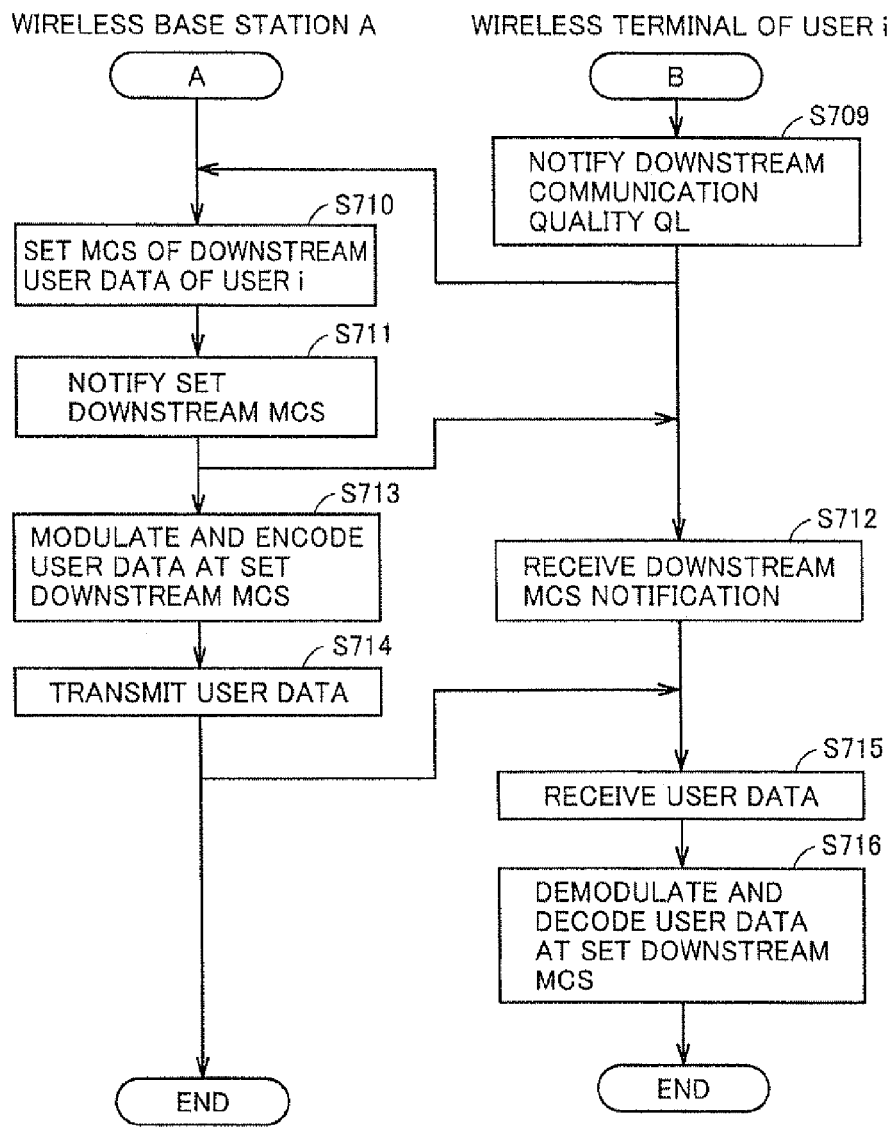
FIG. 18 is a flowchart representing a downstream MCS setting procedure of a wireless communication system according to the first embodiment of the present invention.

FIGS. 17 and 18 are flowcharts representing the downstream MCS setting procedure of the wireless communication system according to the first embodiment of the present invention. FIGS. 17 and 18 represent the procedure of the downstream MCS being estimated at a wireless terminal of user i.

Referring to FIGS. 17 and 18, terminal speed identification unit 30 of wireless base station 2 identifies the moving speed of wireless terminal 3 of user i based on two or more reception response vectors differing in time of the wireless terminal of user i (step S701).

Then, when wireless terminal 3 of user i is moving at high speed, i.e. the moving speed is greater than or equal to a predetermined value (YES at step S702), user management unit 37 of wireless base station 2 sets the speed state of wireless terminal 3 of user i at a high speed moving state (step S703). When wireless terminal 3 of user i is not moving at high speed, i.e. the moving speed is below the predetermined value (NO at step S702), user management unit 37 sets the speed rate of wireless terminal 3 of user i at the normal state (step S704).

Then, user management unit 37 notifies the wireless terminal of user i of the set speed state via transmission unit 13. Transmission unit 13 transmits the data representing the speed state set for user i using a portion of the region of DL_MAP of OFDMA (step S705).

When downstream communication quality measurement unit 252 of wireless terminal 3 of user i is notified that the speed state of its own terminal is at the high speed moving state (YES at step S706), the CINR of the downstream user data of its own terminal is calculated at each of the most recently received Nf (=4, for example) OFDMA frames. Downstream communication quality measurement unit 252 calculates the average of the calculated Nf CINR values as downstream communication quality QL (step S707).

When downstream communication quality measurement unit 252 is notified that the speed state of its own terminal is at the normal state (NO at step S706), the CINR of downstream user data of its own terminal is calculated at each of the most recently received No (=20, for example) OFDMA frames. Downstream communication quality measurement unit 252 calculates the average of the calculated No CINR values as downstream communication quality QL (step S708).

Then, downstream communication quality measurement unit 252 transmits the data representing downstream communication quality QL to wireless base station 2 via transmission unit 13 (step S709).

Upon receiving the data representing downstream communication quality QL, downstream MCS setting unit 253 of wireless base station 2 raises the MCS of downstream user data of wireless terminal 3 of user i by one level when downstream communication quality QL is greater than or equal to threshold value UP_TH, and lowers the MCS of the downstream user data of user i by one level when downstream communication quality QL is less than or equal to threshold value DN_TH (step S710).

Then, downstream MCS setting unit 253 notifies wireless terminal 3 of user i of the set MCS of the downstream user data via transmission unit 13. Transmission unit 13 transmits the data representing the downstream MCS of wireless terminal 3 of user i using a portion of a region of DL-MAP of OFDMA (step S711).

Upon receiving notification of the MCS of the downstream user data via reception unit 52, downstream MCS management unit 251 of wireless terminal 3 of user i sets the MCS for management to the notified one (step S712).

Coding unit 34 of wireless base station 2 encodes the user data at the MCS coding rate set at downstream MCS setting unit 253. Modulation unit 33 modulates the user data at the MCS modulation scheme set at downstream MCS setting unit 253 (step S713).

Transmission unit 13 of the wireless base station transmits the encoded and modulated user data to wireless terminal 3 of user i (step S714).

Then, reception unit 52 of wireless terminal 3 of user i receives the encoded and modulated user data from wireless base station 2 (step S715).

Demodulation unit 65 of wireless terminal 3 of user i demodulates the user data at the MCS modulation scheme set at downstream MCS management unit 251. Decoding unit 66 of wireless terminal 3 of user i decodes the user data at the MCS coding rate set at downstream MCS management unit 251 (step S716).

(Setting of Burst Region)

Figure 19:
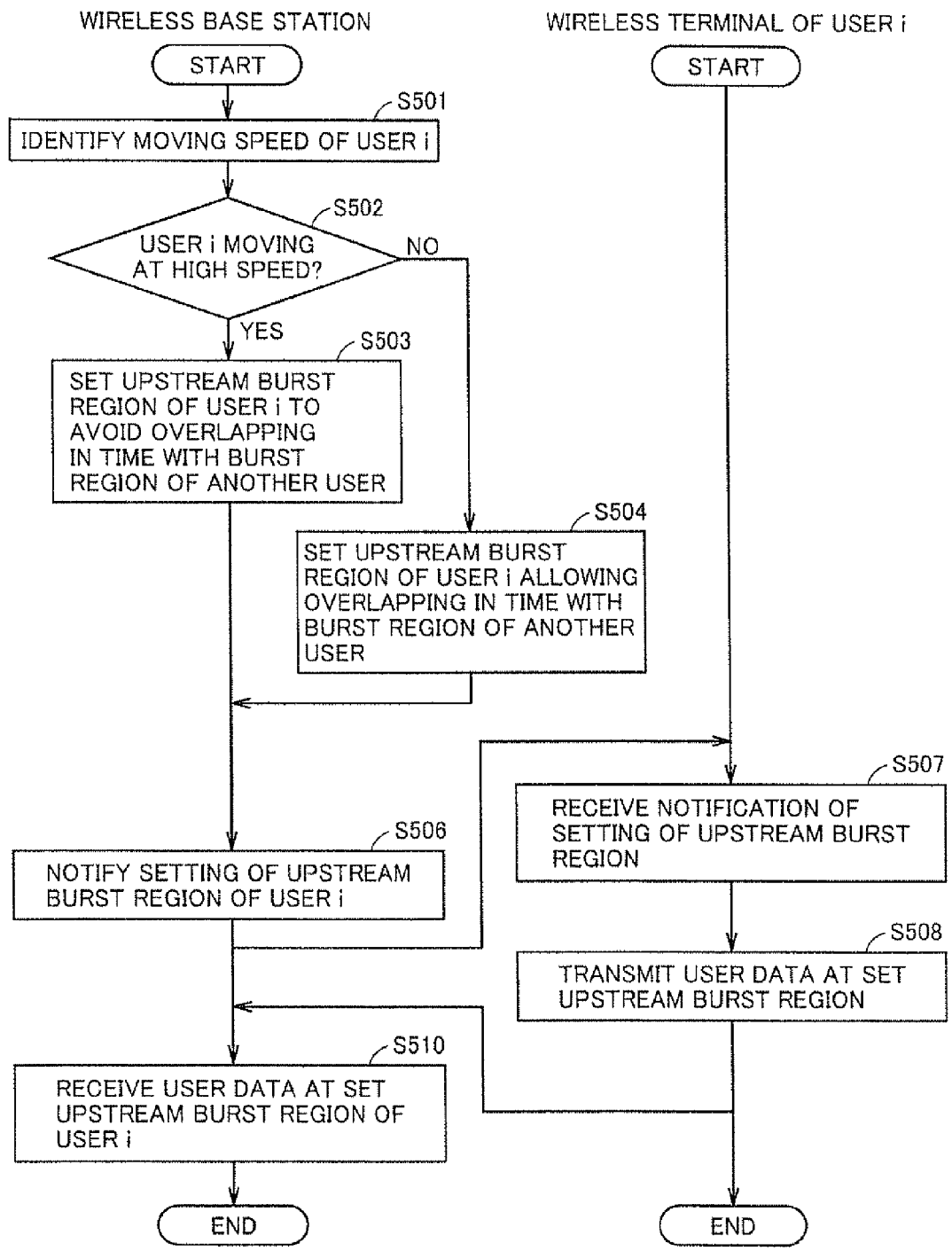
FIG. 19 is a flowchart representing a burst region setting procedure of a wireless communication system according to the first embodiment of the present invention.

FIG. 19 is a flowchart representing a burst region setting procedure of the wireless communication system according to the first embodiment of the present invention. FIG. 19 represents the procedure of the burst region being estimated at a wireless terminal of user i.

Referring to FIG. 19, terminal speed identification unit 30 of wireless base station 2 identifies the moving speed of wireless terminal 3 of user i based on two or more reception response vectors differing in time of the wireless terminal of user i (step S501).

When wireless terminal 3 of user i is moving at high speed, i.e. the moving speed is greater than or equal to a predetermined value (YES at step S502), burst region setting unit 31 of wireless base station 2 sets the burst region of the upstream user data of user i, avoiding overlapping in time with the burst region of another user (step S503).

When wireless terminal 3 of user i is not moving at high speed, i.e. the moving speed is below the predetermined value (NO at step S502), burst region setting unit 31 of wireless base station 2 sets the burst region of the upstream user data of user i, allowing overlapping in time with the burst region of another user (step S504).

Burst region setting unit 31 notifies wireless terminal 3 of user i of the set burst region of the upstream user data. Transmission unit 13 transmits data representing the burst region of the upstream user data of wireless terminal 3 of user i using a portion of the region of UL-MAP of OFDMA (step S506).

Upon receiving notification of the burst region of the upstream user data by reception unit 52, burst region management unit 70 of wireless terminal 3 of user i sets the burst region of the upstream user data at the notified one (step S507).

Transmission unit 53 of wireless terminal 3 of user i transmits the user data using the subcarrier of the set burst region in a symbol (time) of the burst region set at burst region management unit 70 (step S508).

Reception unit 12 of wireless base station 2 receives the user data of the wireless terminal of user i transmitted in the set subcarrier at a symbol (time) of the burst region set at burst region setting unit 31 (step S510).

(Ranging Processing)

Figure 20:
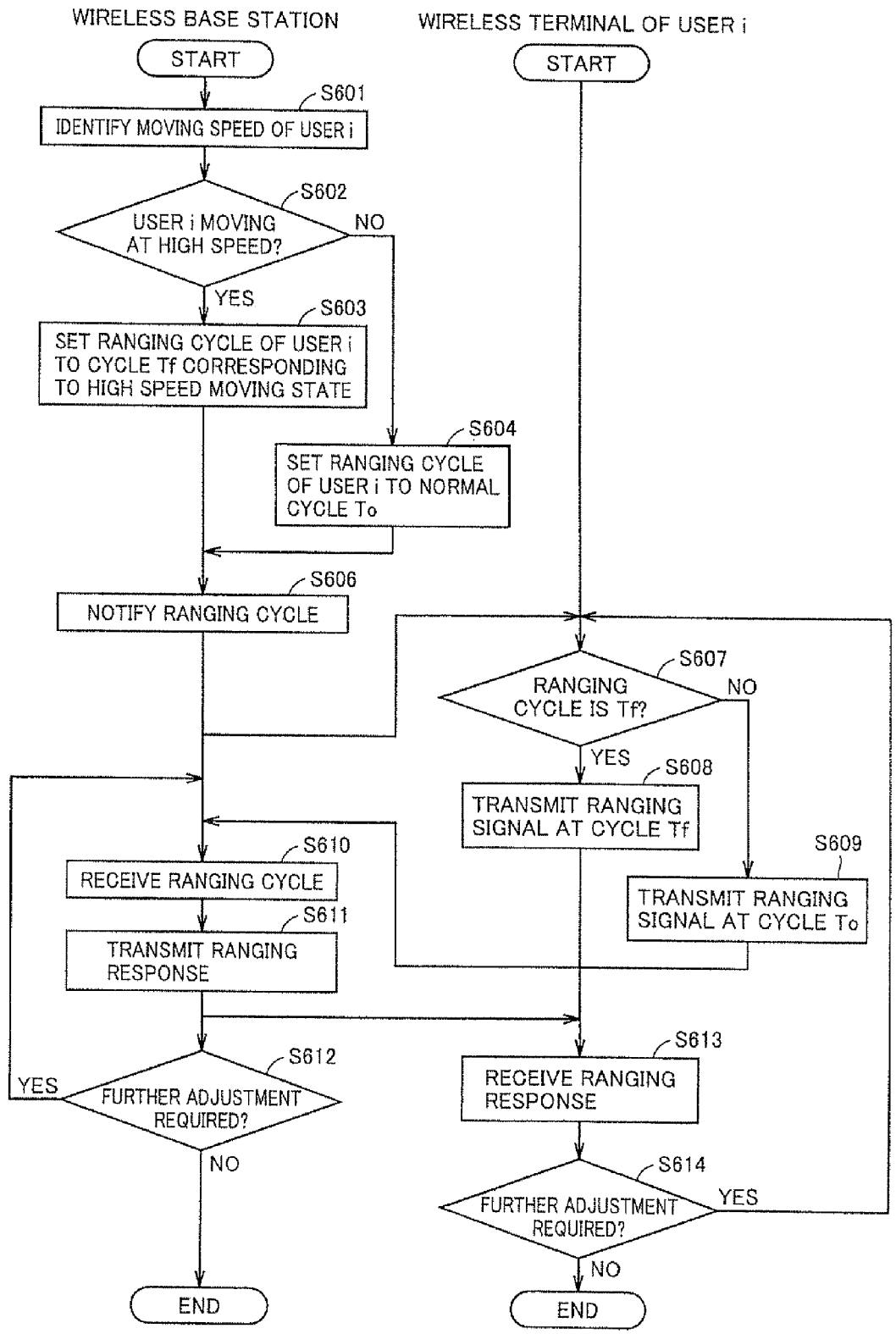
FIG. 20 is a flowchart representing a ranging process procedure of a wireless communication system according to the first embodiment of the present invention

FIG. 20 is a flowchart representing the ranging processing procedure of the wireless communication system according to the first embodiment of the present invention. FIG. 20 represents the procedure of carrying out ranging at a wireless terminal of user i.

Referring to FIG. 20, terminal speed identification unit 30 of wireless base station 2 identifies the moving speed of wireless terminal 3 of user i based on two or more reception response vectors differing in time of the wireless terminal of user i (step S601).

When wireless teeurinal 3 of user i is moving at high speed, i.e. the moving speed is greater than or equal to a predetermined value (YES at step S602), ranging control unit 32 of wireless base station 2 sets the ranging cycle of wireless terminal 3 of user i at a cycle Tf (=5 frames, for example) corresponding to high speed moving (step S603).

When wireless terminal 3 of user i is not moving at high speed, i.e. the moving speed is below the predetermined value (NO at step S602), ranging control unit 32 of wireless base station 2 sets the ranging cycle of wireless terminal 3 of user i at the normal cycle To (=30 frames, for example) (step S604).

Ranging control unit 32 notifies wireless terminal 3 of user i of the set ranging cycle via transmission unit 13. Transmission unit 13 transmits data representing the set ranging cycle of wireless terminal 3 of user i using a portion of the region of DL-MAP of OFDMA (step S606).

When notification is given that the ranging cycle is cycle Tf (for example, 5 frames) for a high speed moving state (YES at step S607), ranging control unit 69 of wireless terminal 3 of user i transmits the ranging signal to wireless base station 2 at a cycle Tf (=5 frames, for example) (step S608).

When notification is given that the ranging cycle is the normal cycle To (=30 frames, for example) (NO at step S607), ranging control unit 69 transmits the ranging signal to wireless base station 2 at cycle To (=30 frames, for example) (step S609).

Ranging control unit 32 of wireless base station 2 receives a ranging signal from wireless terminal 3 of user i via a reception unit 12 (step S610).

Ranging control unit 32 of wireless base station 2 transmits to wireless terminal 3 of user i according to the received ranging signal a ranging response including status information for notifying whether ranging is completed or not, and when ranging is further required, parameters to adjust the transmission timing of a signal from wireless terminal 3 of user i, the transmission frequency of a signal from wireless terminal 3 of user i, and the transmission power of a signal from wireless terminal 3 of user i (step S611).

Ranging control unit 32 of wireless base station 2 returns to step S610 when further adjustment by ranging is required (YES at step S612), and the process ends when the adjustment is not required (NO at step S612).

Ranging control unit 69 of wireless terminal 3 of user i receives the ranging response (step S613).

When the ranging response indicates that further adjustment is required (YES at step S614), ranging control unit 69 adjusts the signal transmission timing, signal transmission frequency, and signal transmission power according to the parameters in the ranging response, and then returns to step S607. The process ends when the ranging response indicates that further adjustment is not required (NO at step S614).

Since the communication processing scheme is appropriately switched in response to the moving speed of the wireless terminal according to the wireless communication system of an embodiment of the present invention, the problems encountered when a wireless terminal is moving at high speed can be overcome.

With regard to the ranging cycle, since a wireless terminal in a high speed moving state is made to transmit a ranging signal at a ranging cycle sufficiently shorter than that of a normal mode, ranging can be executed again before the distance between a wireless terminal and a wireless base station changes greatly.

As to the assignment of a user uplink burst region, the upstream user data of a wireless terminal in a high speed moving state is allocated to avoid overlapping with another user data in time. Therefore, degradation in the communication performance caused by occurrence of ICI by Doppler shift can be reduced.

As to channel estimation, a symbol not including a pilot signal in a wireless terminal in a high speed moving state has the channel estimation value obtained using a method of high accuracy through interpolation of channel estimation values of a plurality of adjacent symbols. Therefore degradation in the communication performance can be improved.

As to the communication quality and MCS switching, the number of frames to be used in averaging the measurement values of the CINR in each frame is reduced for a wireless terminal in a high speed moving state. Therefore, degradation in the calculating accuracy of the communication quality, and improper switching of MCS can be eliminated.

[Second Embodiment]

Figure 21:
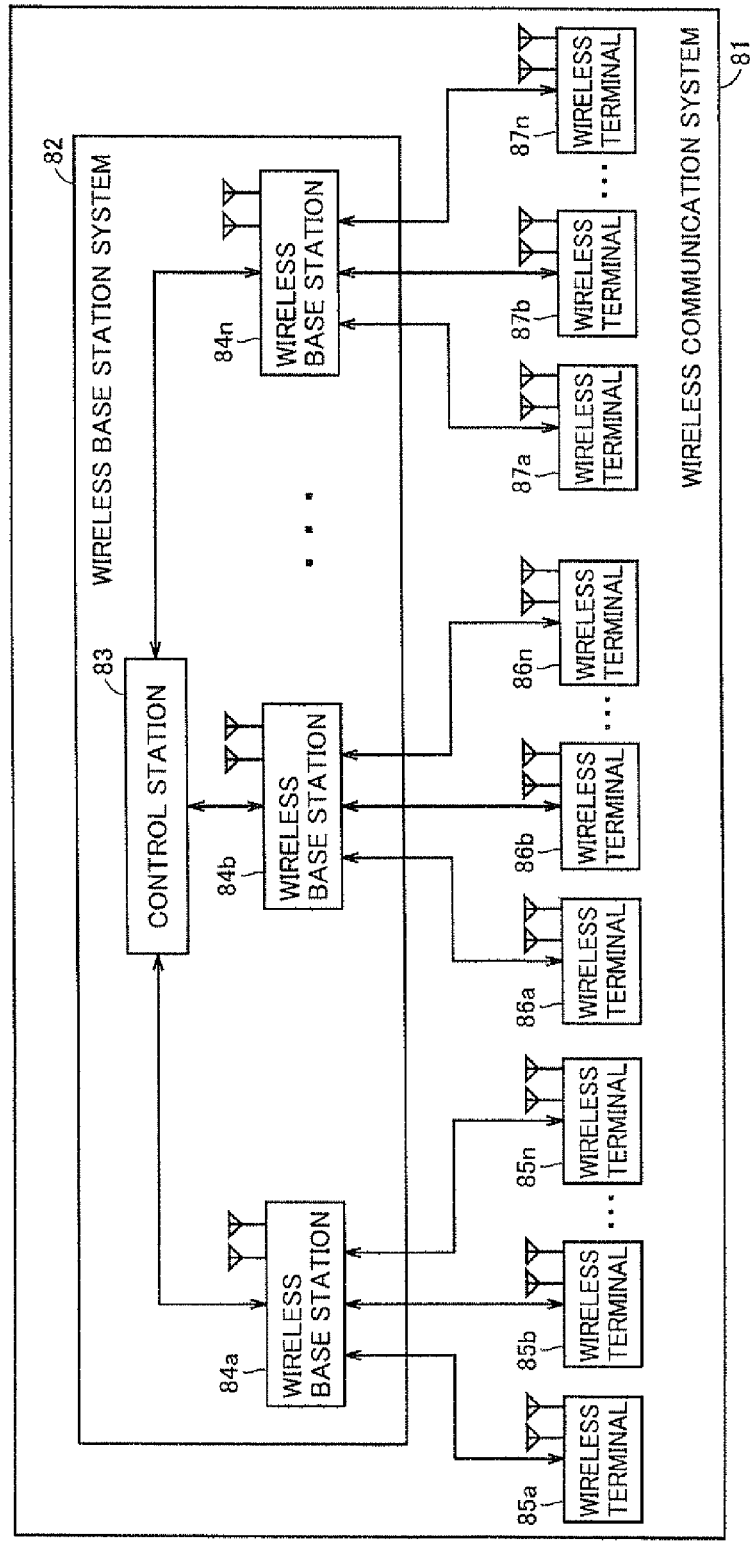
FIG. 21 represents a configuration of a wireless base station system according to a second embodiment of the present invention.

FIG. 21 represents a configuration of a wireless communication system according to a second embodiment of the present invention.

Referring to FIG. 21, a wireless communication system 81 includes a wireless base station system 82, and a plurality of wireless terminals.

Wireless base station system 82 includes a control station 83, and a plurality of wireless base stations 84a-84n. Wireless base station 84*a* communicates under the OFDMA scheme with a plurality of wireless terminals 85*a*-85*n*. Wireless base station 84*b* communicates with a plurality of wireless terminals 86*a*-86*n* under the OFDMA scheme. Wireless base station 84*n* communicates with a plurality of wireless terminals 87*a*-87*n* under the OFDMA scheme.

Figure 22:
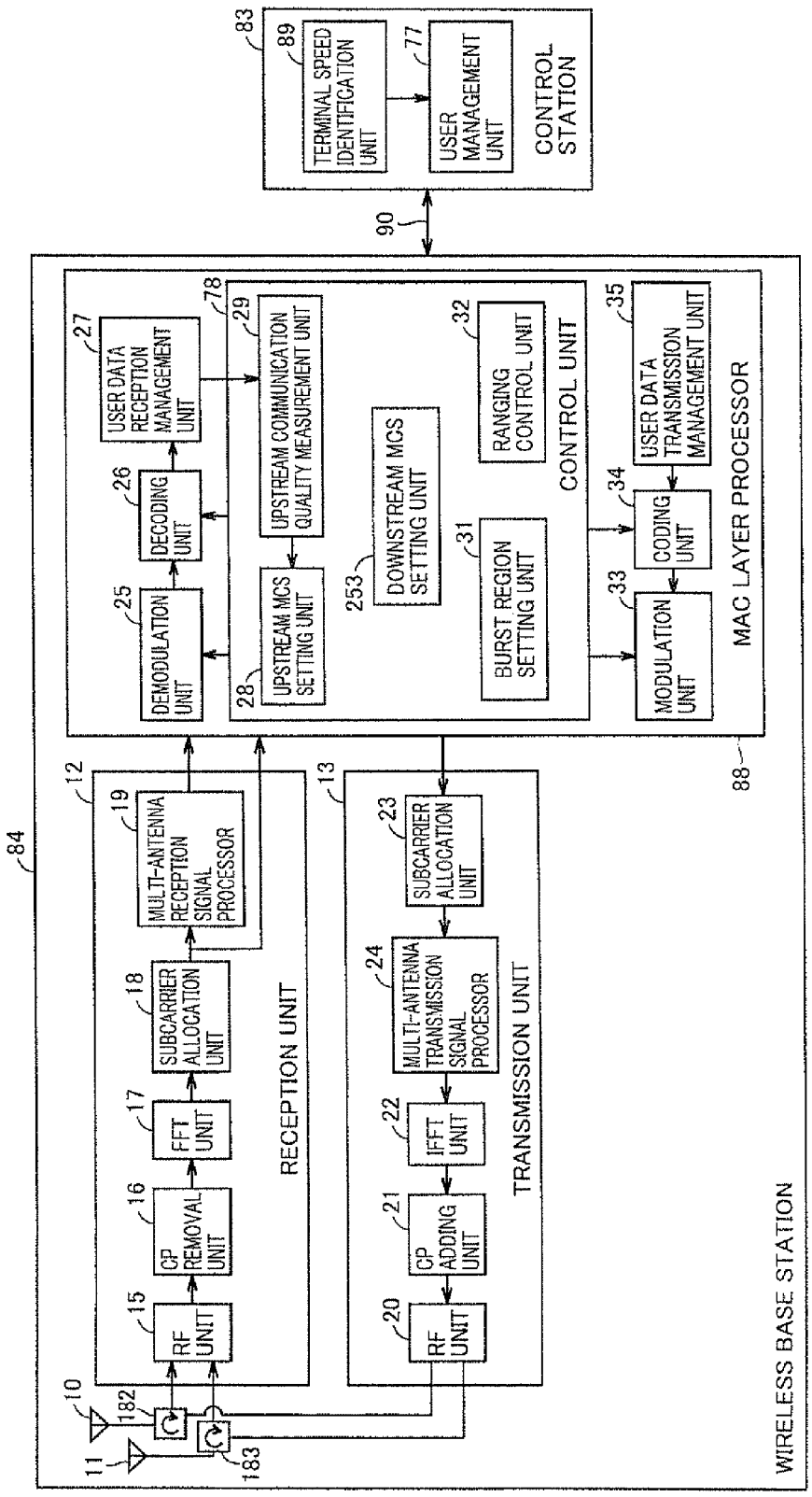
FIG. 22 represents an internal configuration of a wireless base station system of FIG. 21.

FIG. 22 represents an internal structure of the wireless base station system of FIG. 21.

FIG. 22 typically represents a plurality of wireless base stations 84*a*-84*n* as one wireless base station 84.

A portion of the function included in MAC layer processor 14 of wireless base station 2 according to the first embodiment shown in FIG. 2 is arranged in control station 83 according to the second embodiment of FIG. 22. Specifically, control station 83 includes a terminal speed identification unit 89, and a user management unit 77.

Terminal speed identification unit 89 identifies the moving speed of a wireless terminal currently in communication with any of wireless base stations 84*a*-84*n*.

User management unit 77 monitors whether a wireless terminal currently in communication with any of wireless base stations 84*a*-84*n* is in a high speed moving state or in a normal state.

Control station 83 is connected with a wireless base station 84 through a communication cable 90 such as optical fiber. A signal is transmitted between control station 83 and wireless base station 84 through communication cable 90.

Likewise with the first embodiment, the second embodiment can overcome the problems encountered when a wireless terminal moves at high speed. In the second embodiment, the control station can control integrally the speed state of a plurality of wireless terminals communicating with a plurality of wireless base stations connected through a communication cable.

In the second embodiment, the terminal speed identification unit and user management unit among the constituent elements of MAC layer processor 14 in wireless base station 2 of the first embodiment have been shifted to control station 83. Alternatively, a portion or all of the remaining constituent elements of MAC layer processor 14 may be shifted to control station 83. Furthermore, a portion of the transmission unit and reception unit, or all of the constituent elements of wireless base

[Third Embodiment]

Figure 23:
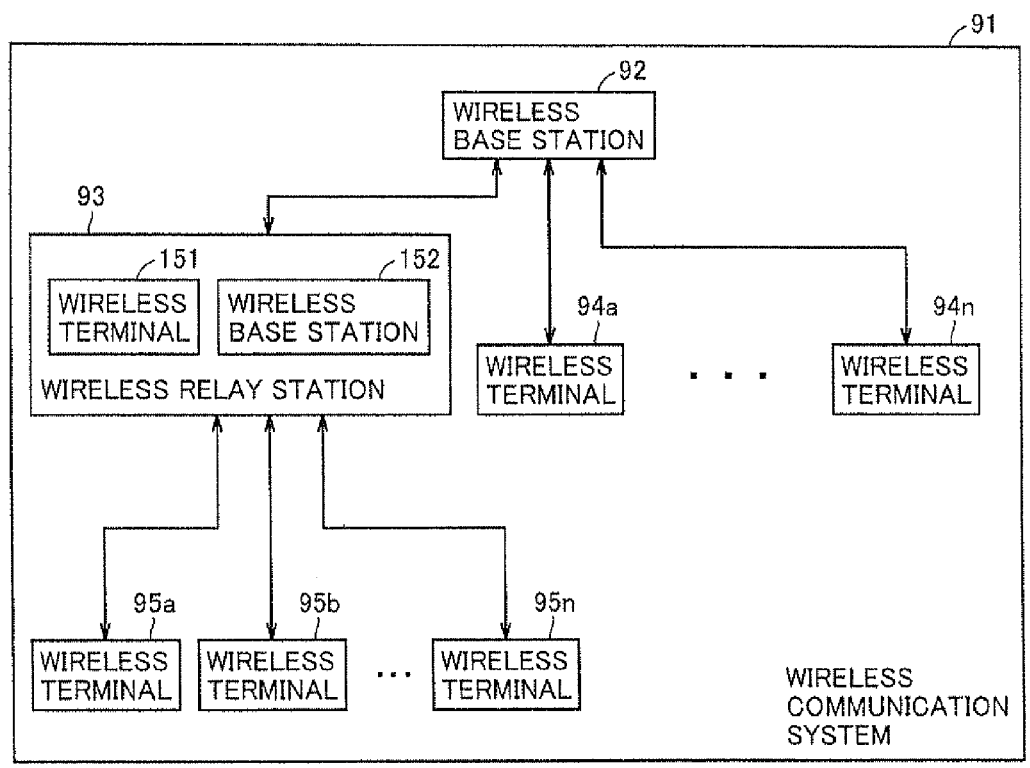
FIG. 23 represents a configuration of a wireless communication system according to a third embodiment of the present invention.

FIG. 23 represents a configuration of a wireless communication system according to a third embodiment of the present invention.

Referring to FIG. 23, a wireless communication system 91 includes a wireless base station 92, a wireless relay station (repeater) 93, and a plurality of wireless terminals 94*a*-94*n* and 95*a*-95*n*.

Wireless communication by the OFDMA scheme is carried out between wireless base station 92 and wireless terminals 94*a*-94*n*.

Wireless relay station 93 receives and processes a signal transmitted from wireless terminals 94*a*-94*n* to transmit a signal based on the processing result to wireless base station 92.

Further, wireless relay station 93 receives and processes a signal transmitted from wireless base station 92 to transmit a signal based on the processing result to wireless terminals 95*a*-95*n*.

Wireless relay station 93 and wireless terminals 95*a*-95*n* are installed in a vehicle that moves at high speed such as the bullet train.

Wireless relay station 93 includes a wireless terminal 151 and a wireless base station 152.

Wireless communication by an OFDMA scheme is carried out between wireless base station 92 and wireless terminal 151 in wireless relay station 93, Wireless terminal 151 in wireless relay station 93 has a configuration and function similar to those of the wireless terminal described in the first embodiment.

Furthermore, wireless communication by the OFDMA scheme is carried out between wireless base station 152 in wireless relay station 93 and wireless terminals 95*a*-95*n*.

Likewise with the first and second embodiments, the problems encountered when a wireless terminal (wireless terminal in the wireless relay station) moves at high speed can be overcome in the third embodiment.

[Modification]

The present invention is not limited to the above-described embodiments, and may include modifications set forth below.

(1) Measurement of Communication Quality

The embodiments of the present invention are based on, but not limited to a configuration in which the number of frames used for measurement of communication quality is altered between a high speed moving mode and a normal mode.

For example, the upstream communication quality measurement unit measures the CINR of upstream user data in each of a plurality of frames, and determines the upstream communication quality QL by the weighted moving average of the measured CINR for each frame. For a wireless terminal moving at a speed greater than or equal to a predetermined speed, the upstream communication quality measurement unit reduces the weight of previous frames in weighted moving average than in a wireless terminal moving at a speed below the predetermined speed.

Similarly, the downstream communication quality measurement unit measures the CINR of downstream user data at each of a plurality of frames, and calculates downstream communication quality QL by the weighted moving average of CINR values measured for each frame. When moving at a speed greater than or equal to a predetermined speed, the downstream communication quality measurement unit reduces the weight of previous frames in the weighted moving average than in the case when moving at a speed below the predetermined speed.

For example, the downstream and upstream communication quality QL is calculated by the weighted moving average of $(1-\alpha) \times x(t) + \alpha \times x(t-1)$, where $x(t)$ is the CINR of the current frame, $x(t-1)$ is the CINR of one preceding frame, and $\alpha$ is a forgetting coefficient. In this weighted moving average, the value of $\alpha$ is set at $\alpha 1$ and $\alpha 2$ when in a high speed moving state and a normal state, respectively. $\alpha 1 < \alpha 2$ is established. Accordingly, the weight of previous frames is reduced in a high speed moving mode.

(2) Moving Speed

The embodiments of the present invention is based on, but not limited to a configuration in which the terminal speed identification unit calculates the moving speed based on the reception response vector of each wireless terminal currently in communication.

Information identifying whether each wireless terminal moves at a speed greater than or equal to a predetermined speed may be stored in a memory, so that the terminal speed identification unit can identify the moving speed of a wireless terminal currently in communication based on the information in the memory.

(3) Notification and Detection of Moving Speed

Embodiments of the present invention are based on, are not limited to a configuration in which a speed state (a high speed moving state or normal state) of a wireless terminal is notified from a wireless base station to the relevant wireless terminal using DL-MAP, and the wireless terminal switches the channel estimation method (channel estimation scheme for high speed moving state or for normal state), and the measurement method of downstream communication quality (number of frames Nf, No used in averaging CINR), according to the notified speed state.

For example, as to the channel estimation method, the wireless base station may be configured to transmit to a wireless terminal, when a detection is made that the wireless terminal is moving at high speed, instruction information causing execution of a channel estimation scheme corresponding to a high speed moving state using DL-MAP, and transmit to a wireless terminal, when a detection is made that the wireless terminal is in a normal state (not moving at high speed), instruction information causing execution of the normal channel estimation scheme using DL-MAP.

As to the method of measuring the downstream communication quality, the wireless terminal may be configured to calculate and transmit to a wireless base station the CINR of downstream user data at each of OFDMA frames, and the wireless base station may be configured to switch the number of frames to be used in averaging CINR according to the speed state of the wireless terminal. In other words, when the speed state of the wireless terminal is at a high speed moving state, downstream communication quality measurement unit of the wireless base station calculates the average of the most recently received Nf CINR values as downstream communication quality QL. When the speed state of the wireless terminal is at the normal state, the downstream communication quality measurement unit of the wireless base station calculates the average of the most recently received No CINR values as downstream communication quality QL.

Alternatively, the wireless base station may be configured to transmit to a wireless terminal, when a detection is made that the wireless terminal is moving at high speed, instruction information causing calculation of the downstream communication quality using Nf frames for averaging the CINR using DL-MAP, and transmit to a wireless terminal, when a detection is made that the wireless terminal is in a normal state (not moving at high speed), instruction information causing calculation of the downstream communication quality using No frames for averaging the CINR using DL-MAP.

Furthermore, the wireless terminal can detect its own speed state, and switch the channel estimation method (channel estimation scheme for high speed moving state or for normal state), and the measurement method of downstream communication quality (number of frames Nf, No used in averaging CINR), according to the detected speed state.

(4) Configuration of Wireless Base Station

As to the configuration of the wireless base station shown in FIG. 2, for example, antennas 10 and 11 as well as RF units 15 and 20 may be arranged at a site remote from the other constituent elements. Alternatively, only antennas 10 and 11 may be arranged at a site remote from the other constituent elements.

(5) OFDM

The embodiments of the present invention have been described, but not limited to a configuration in which the communication scheme by the OFDMA is employed, by way of example. For example, the communication scheme employed may be the OFDM scheme.

It is to be understood that the embodiments disclosed herein are only by way of example, and is not to be taken by way of limitation. The scope of the present invention is not limited by the description above, but not rather by the terms of the appended claims, and is intended to include any modification within the scope and meaning equivalent to the terms of the claims.

Reference Signs List 1, 81, 91 wireless communication system; 82 wireless base station system; 83 control station; 2, 84a-84n, 84, 92, 152 wireless base station; 3, 3a-3n, 85a-85n, 86a-86n, 87a-87n, 94a-94n, 95a-95n, 151 wireless terminal; 93 wireless relay station; 10, 11, 50, 51 antenna; 12, 52 reception unit; 13, 53 transmission unit; 14, 64 MAC layer processor; 15, 20, 55, 60 RF unit; 16, 56 CP removal unit; 17, 57 FFT unit; 18, 23, 58, 63 subcarrier allocation unit; 59 multi-antenna reception signal processor; 21, 61 CP adding unit; 22, 62 IFFT unit; 24 multi-antenna transmission signal processor; 33, 72 modulation unit; 34, 73 coding unit; 35, 74 user data transmission management unit; 25, 65 demodulation unit; 26, 66 decoding unit; 27, 67 user data reception management unit; 36, 75, 78 control unit; 28 upstream MCS setting unit; 29 upstream communication quality measurement unit; 30, 89 terminal speed identification unit; 31 burst region setting unit; 32, 69 ranging control unit; 27, 77 user management unit; 66 speed identification unit; 70 burst region management unit; 71 upstream MCS management unit; 90 communication cable; 251 downstream MCS management unit; 252 downstream communication quality measurement unit; 253 downstream MCS setting unit; 182, 183, 282, 283 couple/distributor.

The invention claimed is:

1. A wireless base station communicating with a plurality of wireless terminals by an Orthogonal Frequency-Division Multiplexing (OFDM) scheme or Orthogonal Frequency-Division Multiple Access (OFDMA) scheme, comprising:

an identification unit at the wireless base station that allows the wireless base station to calculate a moving speed of a wireless terminal currently in communication, a ranging control unit setting a transmission cycle of a ranging signal of a wireless terminal moving at a speed greater than or equal to a predetermined speed shorter than the transmission cycle of a ranging signal of a wireless terminal moving at a speed below said predetermined speed so that an amount of frames for a ranging cycle for the terminal moving at a speed greater than or equal to a predetermine speed is reduced relative to an amount of frames for a ranging cycle of a ranging signal of a wireless terminal moving at a speed below said predetermined speed, a transmission unit transmitting a signal notifying said set ranging signal transmission cycle to said wireless terminal, and a reception unit receiving a ranging signal from a wireless terminal currently in communication.

2. A wireless base station system including a plurality of wireless base stations and a control station controlling said plurality of wireless base stations, communicating with a plurality of wireless terminals by an Orthogonal Frequency-Division Multiplexing (OFDM) scheme or Orthogonal Frequency-Division Multiple Access (OFDMA) scheme, said system comprising:

an identification unit at the wireless base station that allows the wireless base station to calculate a moving speed of a wireless terminal currently in communication with any wireless base station, a ranging control unit setting a transmission cycle of a ranging signal of a wireless terminal moving at a speed greater than or equal to a predetermined speed shorter than the transmission cycle of a ranging signal of a wireless terminal moving at a speed below said predetermined speed so that an amount of frames for a ranging cycle for the terminal moving at a speed greater than or equal to a predetermined speed is reduced relative to an amount of frames for a ranging cycle of a ranging signal of a wireless terminal moving at a speed below said predetermined speed, a transmission unit transmitting to said wireless terminal a signal notifying said set ranging signal transmission cycle, and a reception unit receiving a ranging signal from a wireless terminal currently in communication, said identification unit arranged at said control station, said transmission unit and reception unit arranged at said wireless base station, and said ranging control unit arranged at either said control station or any of said each of wireless base stations.

\* \* \* \* \*